(12) United States Patent
Koyama et al.

(10) Patent No.: US 6,607,280 B2
(45) Date of Patent: *Aug. 19, 2003

(54) PROJECTION APPARATUS

(75) Inventors: Osamu Koyama, Hachioji (JP);
Yoshiaki Kurioka, Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,955

(22) Filed: Dec. 23, 1998

(65) Prior Publication Data
US 2003/0086253 A1 May 8, 2003

(30) Foreign Application Priority Data
Dec. 27, 1997 (JP) .............................. 9-368969

(51) Int. Cl.$^7$ ................................. F21V 7/04
(52) U.S. Cl. ............... 362/31; 362/268; 362/296; 362/353; 349/10; 353/97; 353/119; 353/122; 359/254; 359/634
(58) Field of Search .............. 362/31, 296, 268, 362/353, 349; 355/71; 349/110, 10, 5; 348/742, 758, 767; 359/634; 353/97

(56) References Cited

U.S. PATENT DOCUMENTS

| | | | | |
|---|---|---|---|---|
| 5,379,083 A | * | 1/1995 | Tomita | 353/122 |
| 5,386,306 A | * | 1/1995 | Gunjima | 359/52 |
| 5,398,081 A | * | 3/1995 | Jones | 348/742 |
| 5,622,418 A | * | 4/1997 | Daijogo et al. | 349/62 |
| 5,631,750 A | * | 5/1997 | Minoura et al. | 349/110 |
| 5,648,860 A | * | 7/1997 | Ooi et al. | 349/10 |
| 5,696,865 A | * | 12/1997 | Beeson et al. | 385/146 |
| 5,798,805 A | * | 8/1998 | Ooi et al. | 349/10 |
| 5,800,033 A | * | 9/1998 | Funanami et al. | 530/97 |
| 5,829,858 A | * | 11/1998 | Levis et al. | 353/122 |
| 5,839,808 A | * | 11/1998 | Koyama et al. | 353/97 |
| 5,949,569 A | * | 9/1999 | Shimura | 359/254 |
| 5,993,012 A | * | 11/1999 | Buchanan et al. | 353/71 |
| 5,999,335 A | * | 12/1999 | Koyama | 359/738 |

* cited by examiner

Primary Examiner—Sandra O'Shea
Assistant Examiner—James Cranson
(74) Attorney, Agent, or Firm—Morgan & Finnegan, LLP

(57) ABSTRACT

In a projection apparatus, a light beam emitted by a light source is guided to a modulation element for forming an image. The light beam emerged from the modulation element is projected onto a screen by a projection lens. An image of the light source is formed as a first light source image by a first optical system. The light beam from the modulation element illuminated with light emanating from the first light source image is imaged by a second optical system as a second light source image at a potion in the vicinity of an aperture of a stop of the projection lens. A peripheral portion of the first light source image is intercepted by another stop located at a potion conjugate with the stop of the projection lens.

78 Claims, 18 Drawing Sheets

PROJECTION APPARATUS

BACKGROUND OF THE INVENTION

1. Field of the Invention

The present invention relates to a projection apparatus and, more particularly, to a projection apparatus suitable for, e.g., a liquid crystal projector for projecting image information displayed on a light modulation element such as a monochrome liquid crystal, color liquid crystal (color liquid crystal panel), or the like for forming an image onto a screen in an enlarged scale.

2. Related Background Art

Conventionally, various liquid crystal projectors for projecting image information displayed on a liquid crystal panel, which is a light modulation element, onto a screen have been proposed.

FIG. 18 is a schematic view showing principal part of the optical system of a color liquid crystal projector using a reflection liquid crystal, which is proposed by Japanese Laid-Open Patent Application No. 6-265842. This optical system is called a Schlieren optical system.

Referring to FIG. 18, light emitted by a light source 1 is converted into nearly collimated light by a reflector 2 (parabolic mirror), is reflected by a mirror 3, and is then focused to form a light source image near a reflection mirror 5 placed at the stop position of a projection optical system 13. The light beam reflected by the reflection mirror 5 travels toward a plano-convex lens 7, and is converted into collimated light by the plano-convex lens 7. The collimated light is color separated into three, R, G, and B light beams by a cross dichroic prism 8 to respectively illuminate reflection liquid crystal panels 9, 10, and 11 for forming images of the respective colors (wavelength ranges).

The R, G, and B light beams modulated by the reflection liquid crystal panels 9, 10, and 11 are color-synthesized into full-color image light by the cross dichroic prism 8 again. The full-color image light is focused by the plano-convex lens 7, passes through a stop 12, and is then projected onto a screen 15 via the projection optical system 13.

In each liquid crystal panel, for example, a polymer dispersed liquid crystal or polymer network liquid crystal is sealed. When white level is displayed, the liquid crystal becomes transparent to specularly reflect a light beam; when black level is displayed, the liquid crystal scatters and reflects (diffusely reflects) a light beam. The light beams which are reflected by the liquid crystal panels and color-synthesized by the cross dichroic prism 8 are focused at or in the vicinity of the position of the stop 12 of the projection optical system 13. Most of the light beam reflected by each liquid crystal panel pass through the aperture of the stop 12, and display white level on the screen 15 via the projection optical system 13. However, little of the light scattered by the liquid crystal panel pass through the aperture of the stop 12, thus displaying black level on the screen 15.

In this way, image information is displayed using scattering of the liquid crystal, and is projected onto the screen via the projection optical system.

The above-mentioned stop 12 will be explained below with reference to FIG. 19. FIG. 19 shows the relationship between an aperture 12a of the stop 12 placed at the pupil position of the projection optical system (projection lens) 13, and a light source image S'. A pupil 16 of the projection lens 13 has a semi-circular shape since its half portion is occupied by the reflection mirror 5. The light source image S' represents a mode in which the liquid crystal panel reflects an incoming light beam to display white. In case of the other mode in which the liquid crystal panel scatters an incoming light beam to display black, the light source image S' becomes sufficiently larger than the aperture 12a, and only a part of the entire light beam pass through the aperture 12a. If the size of the aperture 12a is increased, the amount of light that reaches the screen 15 increases, and a bright projected image can be obtained. However, since the luminance of black level similarly rises, the contrast lowers. If the size of the aperture 12a is decreased, the contrast can be improved, but the projected image becomes dark. Thus, the brightness and contrast of the projected image normally have a trade-off relationship.

However, in the color liquid crystal projector shown in FIG. 18, even when an aperture 12a smaller than the light source image S' is used to give priority to contrast over the brightness of the projected image, the contrast cannot be improved.

This problem will be explained using FIG. 19. When the light source image S' is classified into portions inside and outside the aperture 12a, only the former portion contributes to the brightness of the projected image when white is displayed on the liquid crystal panel. However, when black is displayed on the liquid crystal panel, since a light beam incident on the liquid crystal panel is scattered, both light beams focused inside and outside the aperture 12a are partially diffused and pass through the aperture 12a. Hence, the contrast lowers due to the presence of the latter light beam.

SUMMARY OF THE INVENTION

It is an object of the present invention to provide a projection apparatus suitable for a high-resolution liquid crystal projector such as a computer monitor, which can project image information with high contrast.

According to one aspect of the present invention, there is provided a projection apparatus which guides a light beam emitted by a light source to at least one light modulation element for forming an image, and projects the light beam coming from the light modulation element onto a screen or the like, by a projection lens wherein a stop is located at a position conjugate with an aperture of a stop of the projection lens to intercept a part of the light beam emitted by the light source.

According to another aspect of the present invention, there is provided a projection apparatus which guides a light beam emitted by a light source to at least one light modulation element for forming an image, and projects the light beam coming from the light modulation element onto a screen or the like, by a projection lens comprising: first optical means for forming an image of the light source as a first light source image; and second optical means for re-imaging the light beam coming from the light modulation element illuminated with light emanating from the first light source image at a position in the vicinity of an aperture of a stop of the projection lens as a second light source image, wherein a peripheral portion of the first light source image is intercepted by stop means located at a position conjugate with the stop of the projection lens.

According to still another aspect of the present invention, there is provided a projection apparatus, which has color-separation means for separating a white light beam emitted by a light source into a plurality of light beams corresponding to different wavelength ranges, optical means for guiding the plurality of light beams to a plurality of light modulation elements for forming images corresponding to the respective wavelength ranges, synthesizing means for synthesizing the light beams coming from the plurality of light modulation elements, and a projection lens for projecting the light beam synthesized by the synthesizing means onto a screen or the like, comprising: first optical means for forming images of the light source as first light source images; and second optical means for imaging light beams coming from the plurality of light modulation elements illuminated with light beams emanating from the first light source images to re-form second light source images of the light source at or in the vicinity of a stop position of the projection lens via the synthesizing means, wherein peripheral portions of the first light source images are intercepted by stop means located at a position conjugate with the stop position.

According to still another aspect of the present invention, there is provided a projection apparatus comprising: color-separation means for separating a white light beam emitted by a light source into a plurality of color light beams corresponding to different wavelength ranges; first lens means for imaging the color light beams coming from the color-separation means to form first light source images of the light source; deflection means, located in the vicinity of the imaging position of the first lens means, for deflecting and guiding the light beams to a plurality of light modulation elements for forming images corresponding to the respective wavelength ranges; second lens means for re-imaging the color light beams from the plurality of light modulation elements to form second light source images of the light source; synthesizing means for deflecting at least one of the light beams coming from the plurality of light modulation elements, and synthesizing the deflected light beam with the remaining light beams; and a projection lens for projecting the light beams modulated by the plurality of light modulation elements onto a screen or the like, wherein the second light source images are formed at or in the vicinity of a stop position of the projection lens, the synthesizing means is placed near the stop position of the projection lens to split an aperture thereof, and peripheral portions of the first light source images for the respective colors are intercepted by stops provided for the respective at a position conjugate with the stop position in color light beams.

According to another aspect of the present invention, there is still provided a projection apparatus, which has a light source, focusing means for focusing a light beam emitted by the light source to form a light source image, light guiding means, having first and second end faces, for receiving the light beam from the first end face and outputting the light beam from the second end face, the light guiding means being constructed by reflection surfaces which connect the first and second end faces, and reflecting and guiding at least a part of the light beam received from the first end face to the second end face, optical means for guiding the light beam coming from the second end face to an image modulation element, a projection lens for projecting an image on the image modulation element onto a screen, and optical means for focusing and guiding the light beam modulated by the image modulation element on a position of an aperture of a stop of the projection lens, wherein the first end face is located in the vicinity of a focusing position of the light source image, the apparatus further has first optical means for forming an image of the first end face to generate a first light source image, second optical means for imaging the first light source image as a second light source image in the vicinity of the stop position of the projection lens, and third optical means for setting the second end face at a position conjugate with the image modulation element, and a peripheral portion of the first light source image is intercepted by stop means located at a position conjugate with the stop of the projection lens, thereby substantially reducing the size of the second light source image.

According to still another aspect of the present invention, there is provided a projection apparatus which guides a light beam coming from an illumination system to at least one image modulation element, and projects the light beam coming from the image modulation element onto a screen via a projection lens, wherein a peripheral portion of the light beam is intercepted by stop means inserted in the illumination system at a position conjugate with an aperture of a stop of the projection lens, thereby limiting the light beam that passes through the aperture of the stop of the projection lens.

According to still another aspect of the present invention, there is provided a projection apparatus which guides a light beam coming from an illumination system to at least one image modulation element, and projects the light beam coming from the image modulation element onto a screen via a projection lens, wherein an image of a light source in the illumination system is formed on a predetermined plane as a first light source image by first optical means, the light beam emanating from the first light source image is guided to the image modulation element, the light beam coming from the image modulation element is formed as a second light source image at or in the vicinity of a position of an aperture of a stop of the projection lens by second optical means, and a peripheral portion of the first light source image is intercepted by stop means inserted in the illumination system at a position conjugate with the aperture of the stop of the projection lens, thereby reducing the size of the second light source image.

According to still another aspect of the present invention, there is provided a projection apparatus which color-separates a white light beam coming from an illumination system into a plurality of color light beams by color-separation means, guides the plurality of color-separated light beams to image modulation elements provided for the respective color light beams, synthesizes the light beams coming from the image modulation elements by synthesizing means, and projects the light beam synthesized by the synthesizing means via a projection lens, wherein an image of a light source in the illumination system is formed on a predetermined plane by first optical means as a first light source image, the light beam emanating from the first light source image is guided to the image modulation elements, light beams coming from the image modulation elements are formed by second optical means as a second light source image at or in the vicinity of a position of an aperture of a stop of the projection lens, and a peripheral portion of the first light source image is intercepted by stop means inserted in the illumination system at a position conjugate with the aperture of the stop of the projection lens, thereby reducing the size of the second light source image.

According to still another aspect of the present invention, there is provided a projection apparatus which color-separates a white light beam coming from a light source of an illumination system into a plurality of color light beams by color-separation means, forms first light source images of the respective color light beams on a predetermined plane by first optical means, guides light beams emanating from the first light source images to image modulation elements provided for respective color light beams using deflection means, images the light beams coming from the image modulation elements on a predetermined plane as second light source images of the respective color light beams by second optical means, and projects the light beams emanating from the second light images onto a screen via a projection lens, wherein synthesizing means is located at or in the vicinity of a stop position of the projection lens to split an aperture thereof, at least one of the light beams from the plurality of image modulation elements are deflected toward the projection lens, and stop means for the respective color light beams are inserted in the illumination system at a position conjugate with the aperture of the stop of the projection lens to intercept peripheral portions of the first light source images, thereby reducing the size of the second light source image.

According to still another aspect of the present invention, there is provided a projection apparatus which guides a light beam coming from an illumination system to at least one image modulation element, and projects the light beam coming from the image modulation element onto a screen or the like via a projection lens, wherein the illumination system has a hollow or solid rod integrator with an inner reflecting surface, an image of a light source in the illumination system is formed at an entrance end face of the rod integrator by optical means, an image of the entrance end face of the rod integrator is formed on a predetermined plane by the first optical means as a first light source image, a light emanating from the first light source image is guided to the image modulation element, the light beam coming from the image modulation element is imaged by second optical means as a second light source image at or in the vicinity of a position of an aperture of a stop of the projection lens, an exit end face of the rod integrator is conjugate with the image modulation element, and a peripheral portion of the first light source image is intercepted by stop means inserted in the illumination system at a position conjugate with the aperture of the stop of the projection lens, thereby reducing the size of the second light source image.

According to one aspect of the present invention, the light modulation element comprises a transmission light modulation element using a polymer dispersed liquid crystal.

According to one aspect of the present invention, the light modulation element comprises a reflection light modulation element using a polymer dispersed liquid crystal.

According to one aspect of the present invention, the light modulation element comprises a transmission light modulation element using a polymer network liquid crystal.

According to one aspect of the present invention, the light modulation element comprises a reflection light modulation element using a polymer network liquid crystal.

According to one aspect of the present invention, the color-separation means for separating the white light beam coming from the light source into the plurality of light beams corresponding to the different wavelength ranges comprises a diffraction grating.

According to one aspect of the present invention, the color-separation means for separating the white light beam coming from the light source into the plurality of light beams corresponding to the different wavelength ranges comprises a plurality of dichroic mirrors placed to tilt each other.

According to one aspect of the present invention, the synthesizing means comprises a cross dichroic prism.

According to one aspect of the present invention, the synthesizing means comprises a plurality of mirror means for reflecting the light beam.

According to one aspect of the present invention, the deflection means comprises a plurality of mirror means for reflecting the light beam.

According to one aspect of the present invention, an optical system which sets the stop means at a position conjugate with the aperture of the stop of the projection lens includes at least one aspherical lens.

According to one aspect of the present invention, an optical system which sets the stop means at a position conjugate with the aperture of the stop of the projection lens shares at least a portion of the second optical means.

According to one aspect of the present invention, an optical system which sets the stop means at a position conjugate with the aperture of the stop of the projection lens shares at least a portion of the second lens means.

According to one aspect of the present invention, an optical system which sets the stop means at a position conjugate with the aperture of the stop of the projection lens shares at least portions of the second and third optical means.

According to one aspect of the present invention, the light beam that enters the aperture of the stop is set to have a size substantially the same as an aperture of the stop means.

According to one aspect of the present invention, the second light source image is set to have a size substantially the same as the aperture of the stop.

According to one aspect of the present invention, the aperture of the stop of the projection lens comprises a variable stop, and another variable stop, an aperture size of which changes in association with the variable stop is located at a position conjugate with the aperture of the stop of the projection lens.

According to one aspect of the present invention, the light guiding means, having the first and second end faces, for receiving the light beam from the first end face and outputting the light beam from the second end face comprises a glass rod having a hexahedron shape, and totally reflects at least some light components of the light beam that enters the glass rod from the first end face to guide the light components to the second end face.

According to one aspect of the present invention, the deflection means and stop means are located at positions where the deflection means and stop means do not interfere with each other.

According to one aspect of the present invention, the stop means is located in the vicinity of imaging position of the first light source image, and separated a predetermined distance from the imaging position of the first light source image.

BRIEF DESCRIPTION OF THE DRAWINGS

FIG. 13A is viewed from an arrow 14AB in FIG. 13A;

DETAILED DESCRIPTION OF THE PREFERRED EMBODIMENTS

Figure 1:
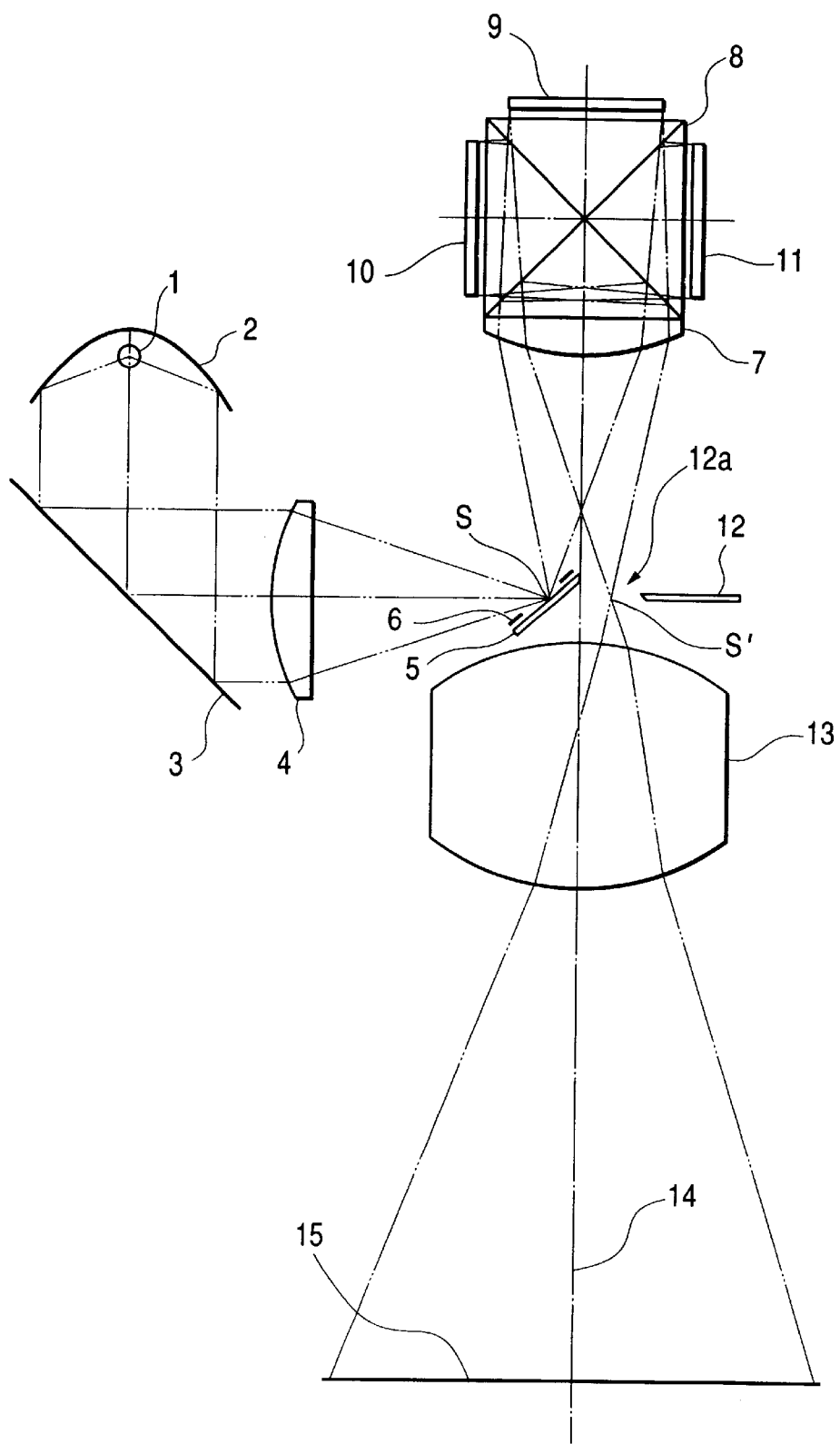
FIG. 1 is a schematic view showing principal part of the first embodiment of the present invention.

FIG. 1 is a schematic view showing the principal part of the first embodiment when a projection apparatus of the present invention is applied to a color liquid crystal projector using reflection liquid crystal panels (light modulation elements for forming images), and FIGS. 2A to 3C are partial explanatory views of FIG. 1.

Referring to FIG. 1, light emitted by a light source 1 is converted into nearly collimated light by a parabolic mirror 2 as a reflector, is reflected by a mirror 3, and is then focused to form a light source image near a reflection mirror 5 placed at the aperture stop position of a projection optical system 13. A stop 6 is placed in the vicinity of the reflection mirror 5 to intercept a part of light beam corresponding to the peripheral region of the light source image S. The light beam reflected by the reflection mirror 5 travels toward a plano-convex lens 7, and is collimated by the plano-convex lens 7. The light is then color-separated into three-color, R, G, and B light beams by a cross dichroic prism (color-separation means) 8, thus illuminating reflection liquid crystal panels (light modulation elements) 9, 10, and 11 of the corresponding wavelength ranges.

The three color light beams modulated by the reflection liquid crystal panels 9, 10, and 11 are color-synthesized into full-color image light by the cross dichroic prism (color-separation means) 8 again. The full-color image light is focused by the plano-convex lens 7 to re-image the light source as a light source image S'. The light source image passes through a stop 12, and is then projected onto a screen 15 via the projection optical system 13.

In each of the liquid crystal panels 9, 10, and 11, for example, a polymer dispersed liquid crystal or polymer network liquid crystal is sealed between a pair of substrates. When white level is displayed, the liquid crystal layer becomes transparent to reflect a light beam; when black level is displayed, the liquid crystal layer scatters a light beam. The three-color, R, G, and B light beams which are reflected by the liquid crystal panels 9, 10, and 11 and color-synthesized by the cross dichroic prism 8 are focused in the vicinity of the position of the stop 12 of the projection optical system 13. Most of the light beam reflected by each of liquid crystal panels 9, 10, and 11 with the transparent liquid crystal layer pass through an aperture 12a of the stop 12, and become incident on the screen 15 via the projection optical system 13 to display white level there. However, little components of the light reflected by each of the liquid crystal panels 9, 10, and 11, the light crystal layers of which are in the light scattering state, pass through the aperture 12a of the stop 12, thus displaying black level on the screen 15. Note that the projection optical system (projection lens) 13 has an optical axis 14.

In this embodiment, image information is displayed using scattering/non-scattering (transparent) of the liquid crystal and is projected onto the screen via the projection optical system.

The focusing state of a light beam (light source image formation state) near the stop 5 and near the stop 12 of the projection lens 13 inserted in an illumination system shown in FIG. 1 will be explained below.

Figure 2A:
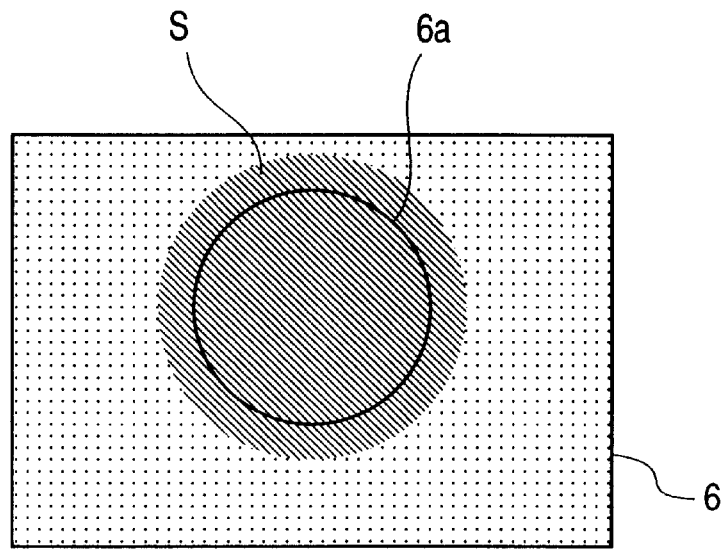
FIGS. 2A and 2B are explanatory views for explaining the relationship between the aperture and light source image according to the first embodiment of the present invention.
Figure 2B:
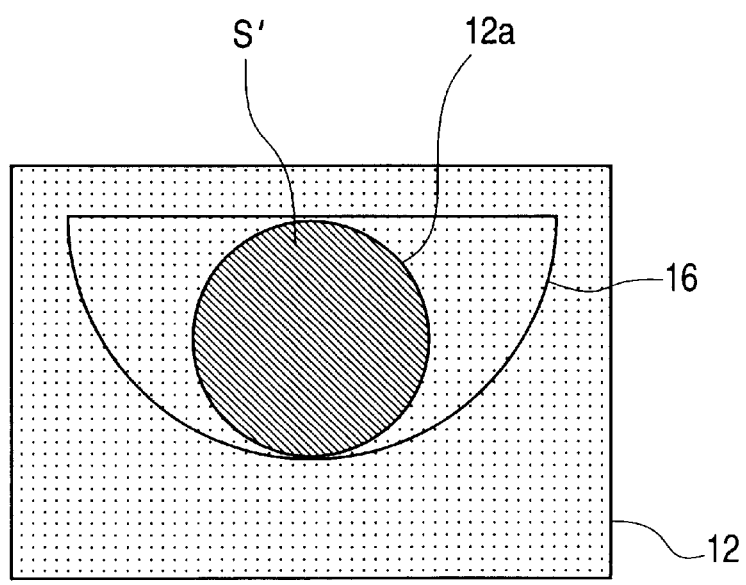

FIG. 2A shows the relationship between an aperture 6a of the stop 6 placed in the vicinity of the position of the reflection mirror 5, and the light source image (first light source image) S. FIG. 2B shows the relationship between the aperture 12a of the stop 12 placed at the pupil position of the projection lens 13 and the light source image (second light source image) S'. Note that the projection lens 13 has a pupil 16, as shown in FIG. 2B.

Referring to FIG. 2A, the aperture 6a is set to be smaller than the light source image S and intercepts the peripheral portion of the light source image S. The size of the aperture 6a is selected so that the light source image S' as an image of the light source image S, the diameter of which is reduced by the aperture 6a, (i.e., as an image obtained by re-imaging the light source) has the same size as that of the aperture 12a in FIG. 2B.

Figure 19:
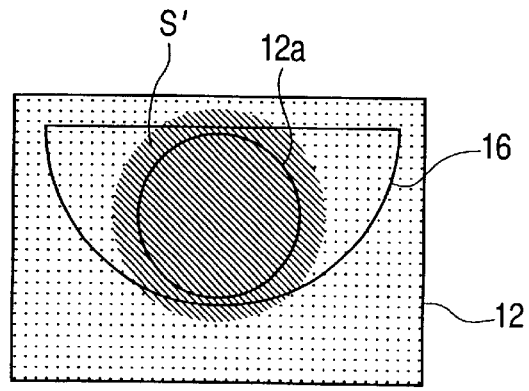
FIG. 19 is an explanatory view for explaining the relationship between the aperture and light source image of the conventional liquid crystal projector.

Also, referring to FIG. 2B, the same aperture 12a as that shown in FIG. 19 is used. The pupil 16 of the projection lens 13 has a semi-circular shape since half the pupil is occupied by the reflection mirror 5.

The light source image S' represents a transparent mode in which the liquid crystal panels 9, 10, and 11 reflect incoming light beams to display white. In the scattering mode in which the liquid crystal panels 9, 10, and 11 scatter incoming light beams to display black, the light source image S' becomes considerably larger than the aperture 12a, and little of the entire light beams pass through the aperture 12a. The difference between this embodiment and the apparatus shown in FIG. 19 lies in that since the peripheral portion of the light source image S is intercepted by the aperture 6a of the stop 6 in advance, the size of the light source image S to be re-imaged is reduced, and consequently, the light source image S' and aperture 12a have equal sizes. That is, when the liquid crystal panels 9, 10, and 11 display white, all the light beam components of the light source image S' pass through the aperture 12a to contribute to the brightness of a projected image. On the other hand, when the liquid crystal panels display black, some of "a light beam Sa which is to be focused on a portion outside the aperture 12a upon displaying white" as in the conventional art never exist, so that no such light beam Sa passes through the aperture 12a in the scattering mode. More specifically, in the conventional art, in the case of the transparent mode in which white is displayed, the light source image larger than the stop aperture 12a is projected, and as a result some of a light beam exist in a portion (light blocking portion) outside the aperture 12a. For this reason, in the case of the scattering mode in which black is displayed, in addition to scattering light caused by said light existing in the light blocking portion of the aperture 12a being scattered upon displaying white, some of scattering light caused by light existing in a portion (light blocking portion) outside the aperture 12a being scattered pass through the aperture 12a, so that the drawback discussed in the background statement happened. On the other hand, according to this embodiment of the invention, in the scattering mode, such phenomenon never occurs that a part of scattering lights caused by scattering the light beams (Sa) existing in a portion outside the aperture 12a being scatterred passes through the aperture 12a since the light beams (Sa) mentioned above do no exist. Namely, the light beams passing through the aperture 12a is reduced by the light beams (Sa) mentioned above in comparison to the conventional art since the light beams (Sa) do not exist and as a matter of course scattering light caused by the light beams (Sa) do not exist. Hence, the contrast of the projected image can be improved.

In FIG. 2B, the size of the aperture 6a is selected so that the light source image S' has the same size as that of the aperture 12a. However, in consideration of positional deviations between the light source image S' and aperture 12a due to manufacturing errors or the like, the light source image S' is preferably set to have a size that can sufficiently cover the aperture 12a, i.e., to be slightly larger than the aperture 12a. With this arrangement, the contrast of the projected image can be satisfactorily improved.

In a Schlieren optical system, the brightness and contrast of the projected image have a trade-off relationship. However, if the aperture 6a uses a variable stop, the aperture size of which changes together with the aperture 12a, maximum contrast can always be obtained at a predetermined brightness in relation to the projected image. More specifically, when priority is given to the brightness of the projected image, the aperture 12a can be set at a maximum diameter that allows the light source image S' to fall within the pupil 16 of the projection lens, and the aperture 6a can be set so that the aperture 12a and the light source image S' have equal sizes. On the other hand, when priority is given to the contrast of the projected image, the aperture 12a can be stopped down to desired contrast, and the aperture 6a can be stopped down so that the aperture 12a and the light source image S' have equal sizes.

In place of the aperture 6a, the size of the reflection surface of the reflection mirror 5 may be set so that the aperture 12a and the light source image S' have equal sizes.

Figure 3A:
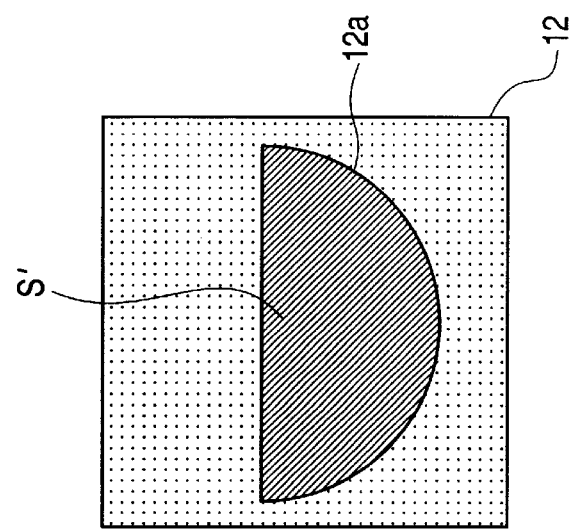
FIGS. 3A, 3B, and 3C are explanatory views for explaining the relationship between the aperture and light source image according to the first embodiment of the present invention.
Figure 3B:
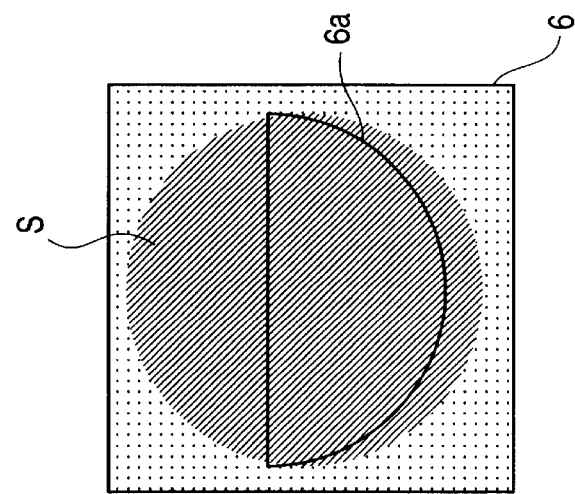
Figure 3C:
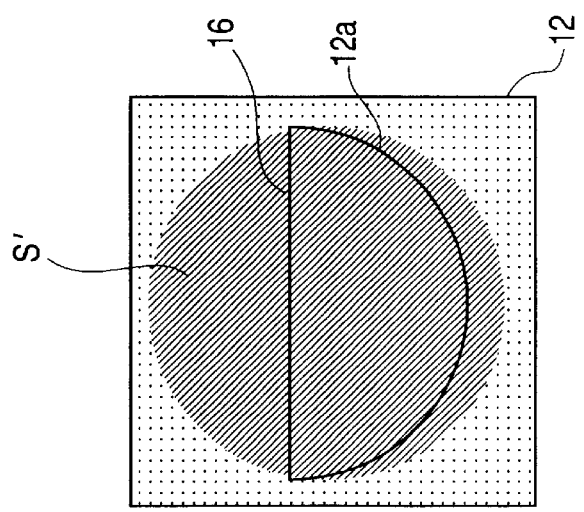

In the above description, a circular stop has been exemplified. However, the present invention is not limited to such specific stop shape. For example, due to limitations on, e.g., the size of the light source, the light source image S' may become larger than the pupil of the projection lens 13, as shown in FIG. 3A. In such case, the aperture 12a is selected to have the same shape as that of the pupil 16. That is, as shown in FIG. 3B, the aperture 6a is set to have a semi-circular shape smaller than the light source image S to intercept the peripheral portion of the light source image S. The aperture 6a is set to have a semi-circular shape, and its size is selected so that the light source image S' has the same size as that of the aperture 12a, as shown in FIG. 3C.

In this way, when the liquid crystal panels 9, 10, and 11 display white, all the light beam of the light source image S' restricted by the aperture 6a pass through the aperture 12a to contribute to the brightness of the projected image. On the other hand, when the liquid crystal panels display black, such penomenon never occurs that some light components of a "light beam (Sa) focused on the peripheral portion of the aperture 12a upon displaying white" are scattered to thereby pass through the aperture 12a. Hence, the contrast can be improved since the light beam (Sa) mentioned above are not present. If a variable stop is used as the stop 12 and a variable stop like in a circular stop is also used as the stop 6 so that the diameter of the aperture 6a changes in association with that of the aperture 12a, maximum contrast can always be obtained at a predetermined brightness of the projected image. In place of the aperture 6a, the reflection surface of the reflection mirror 5 may be set to have a semi-circular shape, and its size may be selected so that the aperture 12a and light source image S' have equal sizes.

The optical system according to the first embodiment of the present invention will be described in more detail below using FIG. 4 which is an exploded view of the optical path of the optical system shown in FIG. 1. For the sake of better understanding, an explanation will be given while transmission liquid crystal panels replace the reflection liquid crystal panels 9, 10, and 11. In other words, FIG. 4 can also be considered as an application of the first embodiment to transmission liquid crystal panels. Optical elements which are not required in the following description are not shown.

Figure 4:
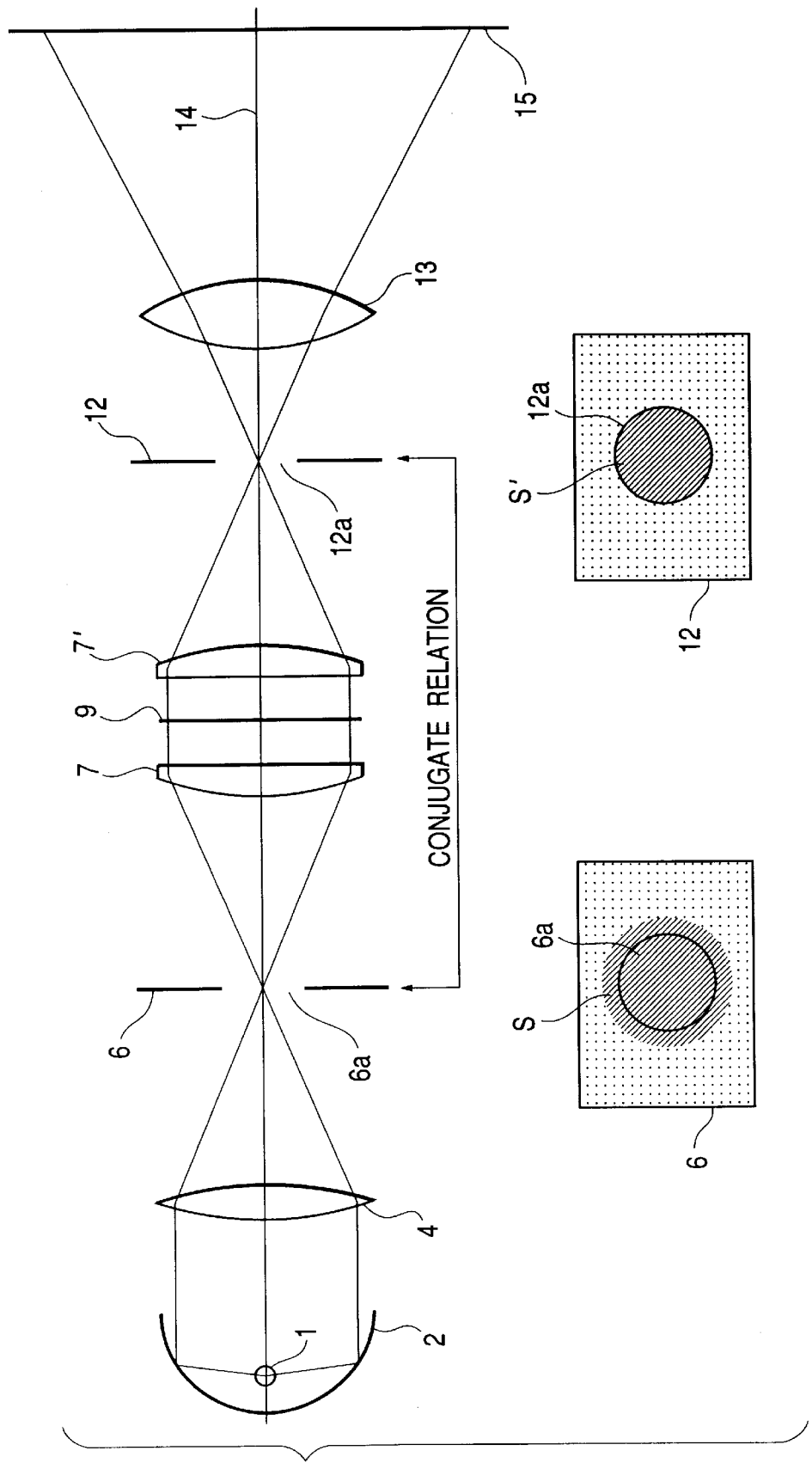
FIG. 4 is an explanatory view for explaining the conjugate relation of an optical system according to the first embodiment of the present invention.

Referring to FIG. 4, light emitted by the light source 1 is converted into nearly collimated light by the parabolic mirror 2, and forms a light source image S at the position of the stop 6 via the focusing lens 4. In FIG. 4, the reflection mirror 5 for deflecting the light beam in FIG. 1 is not shown.

The light beam is output toward the plano-convex lens 7, the focal point position of which coincides with the position of the stop 6, and is converted into collimated light by the plano-convex lens 7, thus illuminating the liquid crystal panel 9. FIG. 4 illustrates one optical path that pertains to the liquid crystal panel 9 of those of three, R, G, and B light beams separated by the cross dichroic prism 8 (FIG. 1), and neither the cross dichroic prism 8 nor the liquid crystal panels 10 and 11 are shown, for the sake of simplicity. Light modulated by the liquid crystal panel 9 is re-focused by a plano-convex lens 7' (which is located at the mirror image position of the plano-convex lens 7 in relation to the liquid crystal panel 9) so as to form a light source image S'. Then, the light passes through the stop 12 and is projected onto the screen 15 via the projection lens 13.

In the liquid crystal panel 9, the above-mentioned polymer dispersed liquid crystal or polymer network liquid crystal is sealed. Upon displaying white level, the liquid crystal layer becomes transparent to transmit a light beam without scattering it; upon displaying black level, the liquid crystal layer scatters the light beam. A light beam coming from the liquid crystal panel 9 in the transparent mode is focused near the stop 12 of the projection lens 13 by the plano-convex lens 7'. Most of the light beam which has been transmitted through the liquid crystal panel pass through the aperture 12a, and display white level on the screen 15 via the projection lens 13. However, little of the entire light beam scattered by the liquid crystal panel in the scattering mode pass through the aperture 12a, thus displaying black level on the screen 15.

The aperture 6a is set to be smaller than the light source image S to intercept the peripheral portion of the light source image S. The size of the aperture 6a is selected so that the light source image S' has the same size as that of the aperture 12a.

Also, in FIG. 4, the pupil of the projection lens 13 has a circular shape like in normal lenses. The light source image S' in FIG. 4 represents the transparent mode in which the liquid crystal panel transmits an incoming light beam without scattering it so as to display white. In the scattering mode in which the liquid crystal panel scatters the incoming light beam to display black, the light source image S' becomes sufficiently larger than the aperture 12a, and little of the entire light beam pass through the aperture 12a. Since the peripheral portion of the light source image S is intercepted in advance by the aperture 6a, the light source image S' and aperture 12a have equal sizes. That is, when white is displayed on the liquid crystal panel, all beams of the light source image S' pass through the aperture 12a to contribute to the brightness of the projected image. On the other hand, when the liquid crystal panel displays black, since such phenomenon never occurs that some of "a light beam (Sa) focused on the portion outside the aperture 12a upon displaying white" are scattered to thereby pass through the aperture 12a, the contrast can be improved.

In FIG. 4, the size of the aperture 6a is selected so that the light source image S' has the same size as that of the aperture 12a. However, in consideration of any positional deviation between the light source image S' and aperture 12a due to manufacturing errors or the like, the light source image S' is preferably set to have a size that can sufficiently cover the aperture 12a, i.e., to be slightly larger than the aperture 12a. With this arrangement, the contrast of the projected image can be satisfactorily improved.

In order to select the size of the aperture 6a so that the light source image S' has the same size as that of the aperture 12a, the two apertures have a conjugate relation via the plano-convex lenses 7 and 7'. That is, the image of the aperture 12a is formed by the plano-convex lenses 7 and 7' at the position of the aperture 6a to have the same size as that of the aperture 6a. In FIG. 4, since the optical systems of the plano-convex lenses 7 and 7' have the magnitude of −1, the apertures 6a and 12a are set to have equal sizes.

In the present invention, the plano-convex lenses 7 and 7' are preferably comprised of aspherical lenses to suppress aberrations. When spherical lenses are used, the light source image S cannot be normally formed as the light source image S' due to spherical aberration. Also, the image of the aperture 6a does not normally match the aperture 12a. In such case, even when the light source image S is partially intercepted by the aperture 6a in advance, the light source image S' and aperture 12a cannot have equal sizes, resulting in drops in the brightness and contrast of the projected image in some cases.

Furthermore, when reflection liquid crystal panels are used, if a plano-convex aspherical lens which has a plane lens surface on the liquid crystal panel side is used, as shown in FIG. 1, the reflected light beam coming from the convex aspherical surface hardly enters the aperture 12a, thus improving the contrast of the projected image. This is because light reflected by the convex surface becomes divergent light.

Using a combination of the plano-convex aspherical lens 7 and the two apertures 6a and 12a, the brightness and contrast of the projected image can be further improved.

Figure 5:
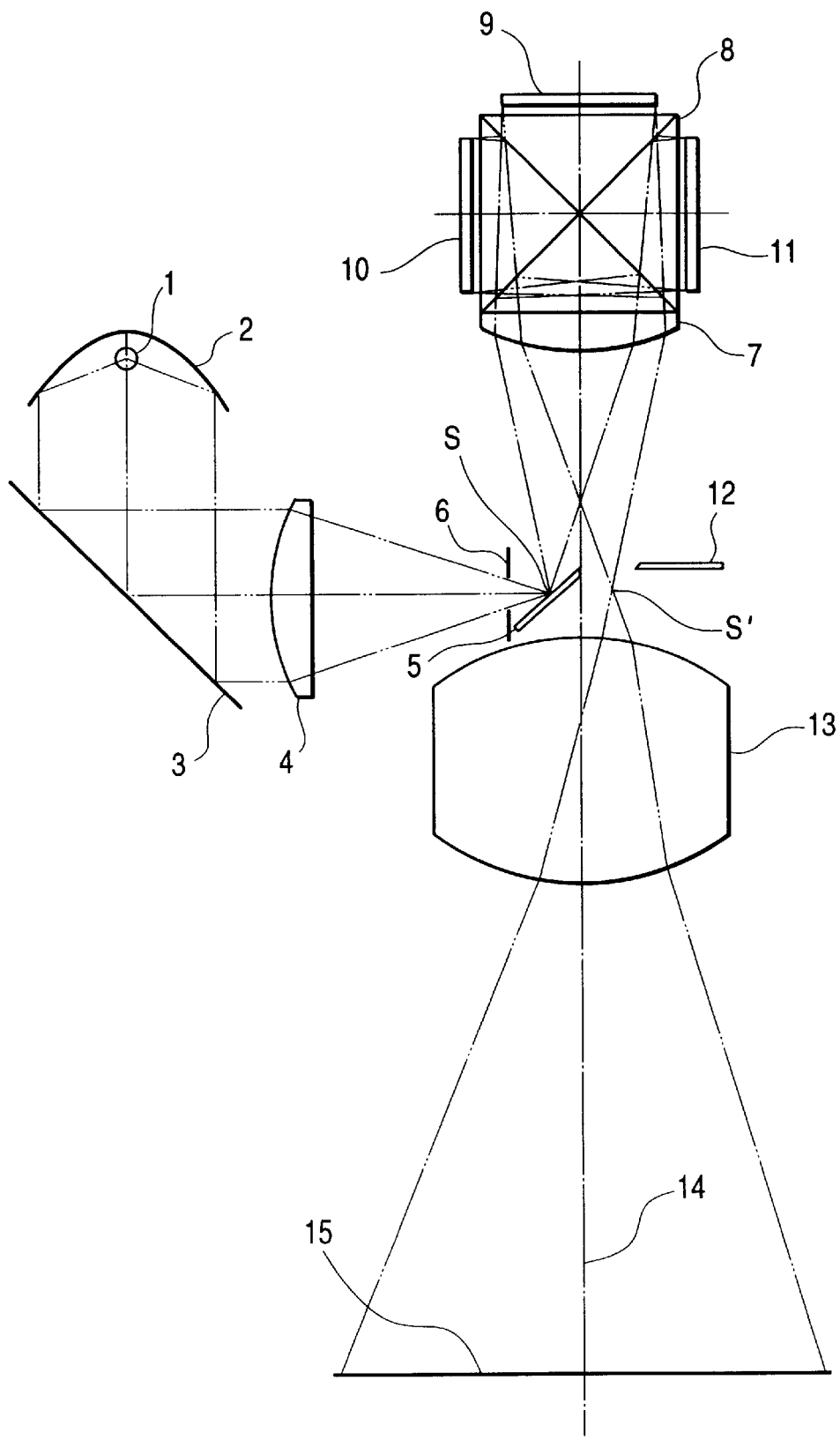
FIG. 5 is a schematic view showing principal part of the second embodiment of the present invention.

FIG. 5 is a schematic view of the second embodiment of the present invention. In this embodiment, the present invention is applied to a color liquid crystal projector using reflection liquid crystal panels, as in the first embodiment shown in FIG. 1. This embodiment has substantially the same arrangement as that of the first embodiment, except that a stop 6 is slightly separated from a reflection mirror 5, and is placed to be perpendicular to the optical axis.

Referring to FIG. 5, light emitted by a light source 1 is converted into nearly collimated light by a parabolic mirror 2, and is reflected by a mirror 3. The reflected light forms, via a focusing lens 4, a light source image S near a reflection mirror 5, which is placed at the aperture stop position of a projection lens 13.

A stop 6 is placed in front of the reflection mirror 5 to intercept some light components of the light source image S. The light beam reflected by the reflection mirror 5 is directed toward a plano-convex lens 7, and is converted into a divergent light beam, which is close to collimated light, by the plano-convex lens 7. The converted light beam is separated into three, R, G, and B light beams by a cross dichroic prism 8, thus illuminating reflection liquid crystal panels 9, 10, and 11 of the corresponding wavelength ranges. The three color light beams modulated by the reflection liquid crystal panels 9, 10, and 11 are color-synthesized into full-color image light by the cross dichroic prism 8 again. The full-color image light is re-focused by the plano-convex lens 7 to form a light source image S'. The light beam of the light source image passes through an aperture 12a of a stop 12, and is then projected onto a screen 15 via the projection lens 13.

In each of the liquid crystal panels 9, 10, and 11, for example, a polymer dispersed liquid crystal or polymer network liquid crystal is sealed. When white level is displayed, the liquid crystal layer becomes transparent to reflect a light beam without scattering it; when black level is displayed, the liquid crystal layer scatters and reflects a light beam. The three-color, R, G, and B light beams which are reflected by the liquid crystal panels 9, 10, and 11 and color-synthesized by the cross dichroic prism 8 are focused at a position slightly closer to the projection lens 13 than the vicinity of the stop 12 of the projection optical system 13.

Most of the light beam reflected by each of liquid crystal panels 9, 10, and 11 without being scattered pass through the aperture 12a of the stop 12, and become incident on the screen 15 via the projection lens 13 to display white level there. However, little of the light reflected by each of the liquid crystal panels 9, 10, and 11 pass through the aperture 12a of the stop 12, thus displaying black level on the screen 15.

The characteristic feature of the second embodiment of the present invention lies in that the stop 6 is inserted at a position where it does not interfere with the reflection mirror 5 serving as a deflection means. In the first embodiment, since the apertures 6a and 12a have an equal-size imaging relationship therebetween, the stop 6 is placed along the reflection surface of the reflection mirror 5 to avoid interference between the two apertures. Since the aperture 6a has a tilt with respect to the plano-convex lens 7, the image of the aperture 12a is formed slightly deviating from the aperture 6a. In such case, even when the light source image S is partially intercepted by the aperture 6a in advance, the size of the light source image S' cannot be exactly equal to that of the aperture 12a.

However, in the second embodiment, the apertures 6a and 12a are slightly offset from positions of an equal-size imaging relationship, and the aperture 6a is set parallel to the plano-convex lens 7 at a position where it does not interfere with the reflection mirror 5. With this layout, a reduced image of the aperture 6a is formed to match the aperture 12a, and if the light source image S is partially intercepted by the aperture 6a in advance, the light source image S' and aperture 12a can have equal sizes, thus preventing drops in the brightness and contrast of a projected image. Also, since uniform illuminance distributions can be obtained for respective colors, the projected image is free from any color nonuniformity.

The optical system according to the second embodiment of the present invention will be described in more detail below using FIG. 6 which is an exploded view of the optical path of the optical system shown in FIG. 5. To help understand the optical system, an explanation will be given while transmission liquid crystal panels replace the reflection liquid crystal panels. In other words, FIG. 6 can also be considered as an application of the first embodiment to the transmission liquid crystal panels. Optical elements which are not required in the following description are not shown.

Figure 6:
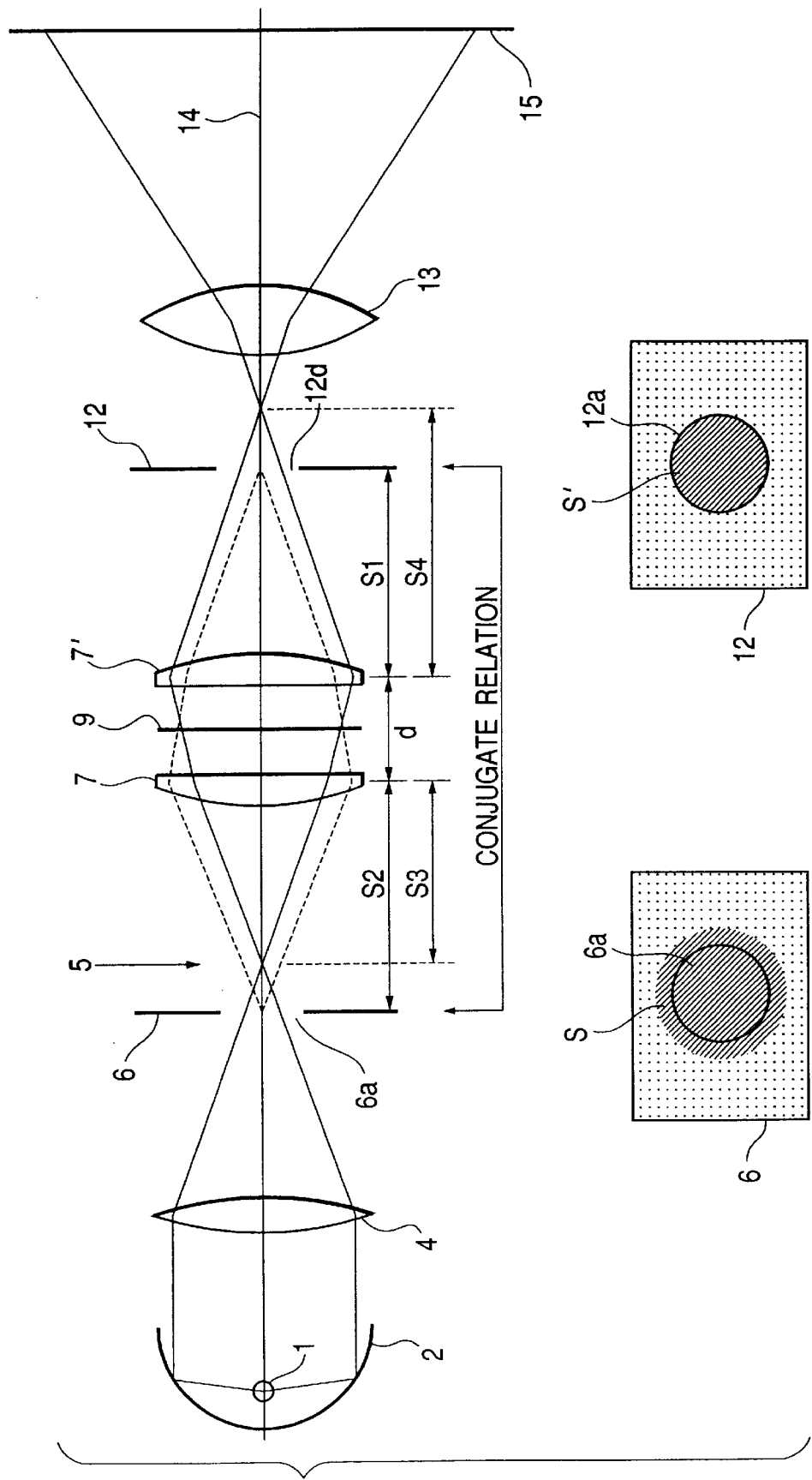
FIG. 6 is an explanatory view for explaining the conjugate relation of an optical system according to the second embodiment of the present invention.

Referring to FIG. 6, light emitted by the light source 1 is converted into nearly collimated light by the parabolic mirror 2, and forms a light source image S at the position of the stop 6 via the focusing lens 4. In FIG. 6, the reflection mirror 5 for deflecting the light beam in FIG. 5 is located at the position indicated by the arrow but is not shown.

The light beam is directed toward the plano-convex lens 7, the focal point position of which coincides with the position of the stop 6, and is converted into slightly divergent light by the plano-convex lens 7, thus illuminating the liquid crystal panel 9. FIG. 6 illustrates one optical path that pertains to the liquid crystal panel 9 of those of three, R, G, and B light beams separated by the cross dichroic prism 8 (FIG. 5), and neither the cross dichroic prism 8 nor the liquid crystal panels 10 and 11 are shown, for the sake of simplicity. Light modulated by the liquid crystal panel 9 is re-focused by a plano-convex lens 7' (which is located at the mirror image position of the plano-convex lens 7 in relation to the liquid crystal panel 9) so as to form a light source image S'. Then, the light passes through the stop 12 and is projected onto the screen 15 via the projection lens 13.

In the liquid crystal panel 9, the above-mentioned polymer dispersed liquid crystal or polymer network liquid crystal is sealed. Upon displaying white level, the liquid crystal layer becomes transparent to transmit a light beam without scattering it; upon displaying black level, the liquid crystal layer scatters the light beam. A light beam coming from the liquid crystal panel 9 in the transparent mode is focused at a position slightly closer to the projection lens 13 than the vicinity of the stop 12 of the projection lens 13 by the plano-convex lens 7'. Most of the light beam which has been transmitted through the liquid crystal panel pass through the aperture 12a, and display white level on the screen 15 via the projection lens 13. However, little of the entire light beam scattered by the liquid crystal panel in the scattering mode pass through the aperture 12a, thus displaying black level on the screen 15.

The aperture 6a is set to be smaller than the light source image S to intercept the peripheral portion of the light source image S. The size of the aperture 6a is selected so that the light source image S' has the same size as that of the aperture 12a.

Also, in FIG. 6, the pupil of the projection lens 13 has a circular shape like in normal lenses. The light source image S' represents the transparent mode in which the liquid crystal panel transmits an incoming light beam without scattering it so as to display white. In the scattering mode in which the liquid crystal panel scatters the incoming light beam to display black, the light source image S' becomes sufficiently larger than the aperture 12a, and little of the entire light beam pass through the aperture 12a. Since the peripheral portion of the light source image S is intercepted in advance by the aperture 6a, the light source image S' and aperture 12a have equal sizes. That is, when white is displayed on the liquid crystal panel, all the light beam components of the light source image S' pass through the aperture 12a to contribute to the brightness of the projected image. On the other hand, when the liquid crystal panel displays black, since such penomenon never occurs that some of "a light beam (Sa) focused on the portion outside the aperture 12a upon displaying white" are scattered to thereby pass through the aperture 12a, the contrast can be improved.

In FIG. 6, the size of the aperture 6a is selected so that the light source image S' has the same size as that of the aperture 12a. However, in consideration of any positional deviation between the light source image S' and aperture 12a due to manufacturing errors or the like, the light source image S' is preferably set to have a size that can sufficiently cover the aperture 12a, i.e., to be slightly larger than the aperture 12a. With this arrangement, the contrast of the projected image can be satisfactorily improved.

In the second embodiment as well, in order to select the size of the aperture 6a so that the light source image S' has the same size as that of the aperture 12a, the two apertures have a conjugate relation via the plano-convex lenses 7 and 7'. That is, the image of the aperture 12a is formed by the plano-convex lenses 7 and 7' at the position of the aperture 6a to have the same size as that of the aperture 6a. In FIG. 6, the images of the two apertures are formed to be slightly offset from positions of an equal-size imaging relationship.

Referring to FIG. 6, if s1 represents the optical distance from the stop 12 to the plano-convex lens 7', f represents the focal length of the plano-convex lenses 7 and 7', and d represents the optical distance (the spacing between the principal planes on the plane lens surface side) between the plano-convex lenses 7 and 7', a distance s2 to the stop 6 is given by:

$$s2=[f \cdot d - f^2 \cdot s1/(s1-f)]/[d-f-f \cdot s1/(s1-f)] \quad (1)$$

A magnification MT is given by:

$$MT=f \cdot s2/[d(s1-f)-s1 \cdot f] \quad (2)$$

This imaging relationship is indicated by the dotted lines in FIG. 6.

On the other hand, if s3 represents the optical distance from the light source S (reflection mirror 5) to the plano-convex lens 7, f represents the focal length of the plano-convex lenses 7 and 7', and d represents the optical distance (the spacing between the principal planes on the plane lens surface side) between the plano-convex lenses 7 and 7', a distance s4 to the light source S' is given by:

$$s4=[f \cdot d - f^2 \cdot s3/(s3-f)]/[d-f-f \cdot s3/(s3-f)] \quad (3)$$

Also, a magnification MT' is given by:

$$MT'=f \cdot s4/[d(s3-f)-s3 \cdot f] \quad (4)$$

This imaging relationship is indicated by the solid lines in FIG. 6.

For example, in this embodiment, f=63 mm, d=20 mm, and s1=s3=59 mm to set s2=s4=67.5 mm. As a result, s2−s3=8.5 mm, and the reflection mirror 5 and stop 6 can be placed without interference between them. Although the deviation between the imaging position of the light source S' and stop 12 is also s4−s1=8.5 mm, this spacing is very small, and any drop of illuminance on the screen 15 due to this deviation is negligible.

Since the imaging magnification MT=−1.12 from equation (2), the aperture 6a is set to have a larger size than the aperture 12a in correspondence with the magnification difference.

In the second embodiment as well, the plano-convex lenses 7 and 7' preferably use aspherical lenses to suppress aberrations.

Furthermore, when reflection liquid crystal panels are used, if a plano-convex aspherical lens which has a plane lens surface on the liquid crystal panel side is used, as shown in FIG. 5, a reflected light beam coming from the convex aspherical surface hardly enters the aperture 12a since it becomes a divergent light beam, thus improving the contrast of the projected image. Using a combination of the plano-convex aspherical lens 7 and the two apertures 6a and 12a, the brightness and contrast of the projected image can be further improved.

Figure 7:
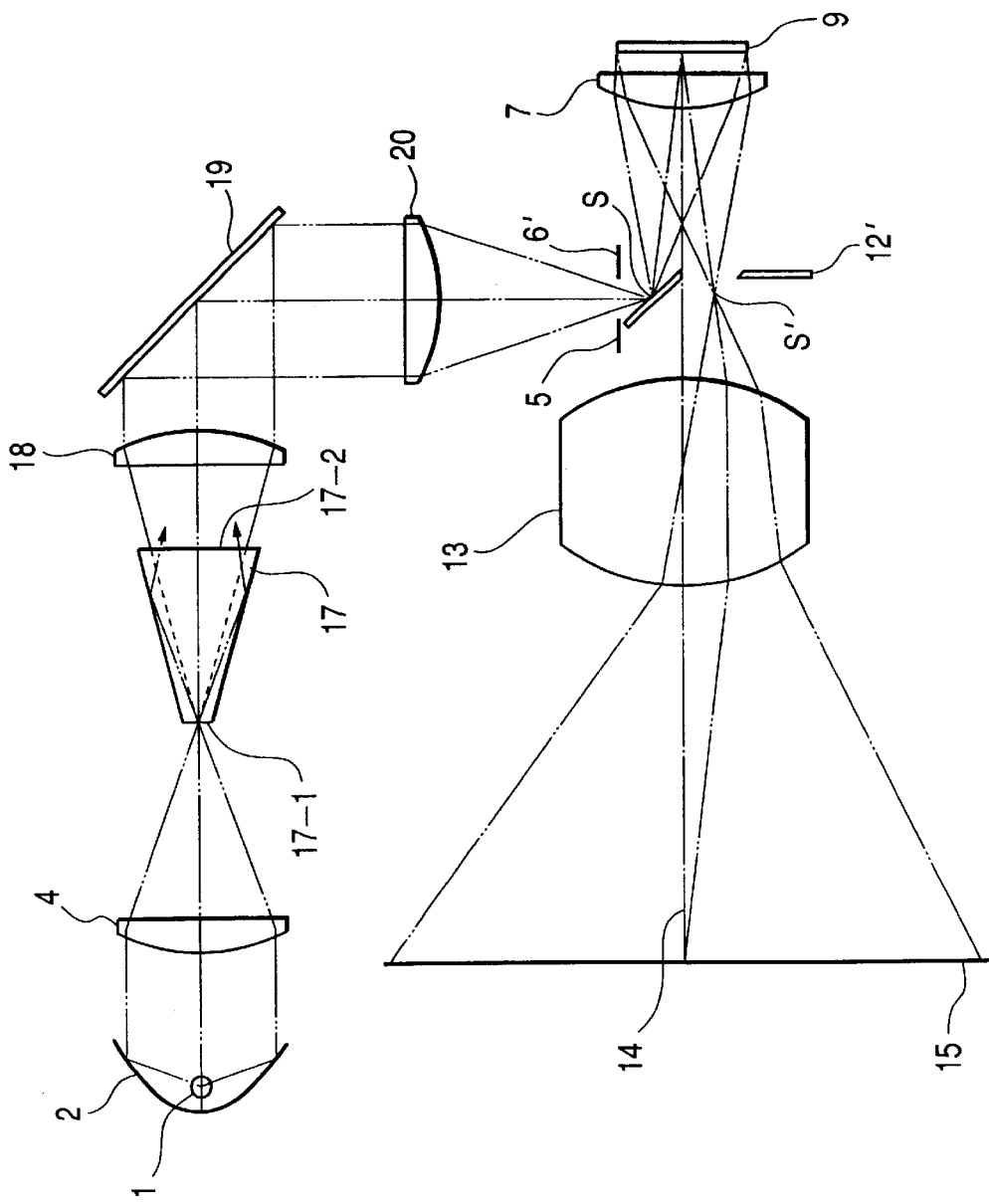
FIG. 7 is a schematic view showing principal part of the third embodiment of the present invention.

FIG. 7 is a schematic view of the third embodiment of the present invention. In this embodiment, the present invention is applied to a liquid crystal projector using a reflection liquid crystal panel, as in FIG. 1. The same reference numerals in FIG. 7 denote the same optical elements as those in FIGS. 1 and 5.

In this embodiment, a monochrome liquid crystal panel is evenly illuminated using a solid or hollow inner surface reflection rod integrator 17.

Referring to FIG. 7, light emitted by a light source 1 is converted into nearly collimated light by a parabolic mirror 2, and forms a light source image at the position of a front end face (light entrance surface) 17-1 of the integrator 17. A part of the light beam that has entered the integrator 17 are transmitted through the integrator; while others are reflected once or several times by the inner surfaces of the integrator and emerge from a rear end face (light exit surface) 17-2.

The integrator 17 preferably comprises a glass rod. The outer shape of the integrator 17 is a hexahedron i.e., frustum of a quadrangular pyramid obtained by cutting off the vertex portion of a quadrangular pyramid parallel to its bottom portion. The integrator 17 has the front end face 17-1 where a light beam enters, and the rear end face 17-2 where a light beam emerges, which are joined by four tapered side surfaces. Like in this embodiment, all the four side surfaces may have tapered angles, or two opposing surfaces of the four side surfaces may be parallel. The two end faces and four side surfaces are optically polished, and the tapered angles of the side surfaces are selected to totally reflect by the inner surfaces light that travels inside the integrator. Of a light beam that has entered the glass rod 17, light beams that have nearly perpendicularly entered the front end face 17-1 are transmitted through the glass rod, while light beams that have obliquely entered the front end face are totally reflected once or several times by the inner surfaces of the glass rod, and then leave the glass rod from the rear end face 17-2.

A light beam coming from the integrator 17 is converted into nearly collimated light by a convex lens 18, and then enters a reflection mirror 19. The light beam reflected by the reflection mirror 19 forms a light source image S in the vicinity of a reflection mirror 5 placed near a stop 12' of a projection lens 13. Immediately before the reflection mirror 5, a stop 6' (stop means) is placed to intercept a peripheral portion as a given portion of the light source image (first light source image) S.

Figure 8:
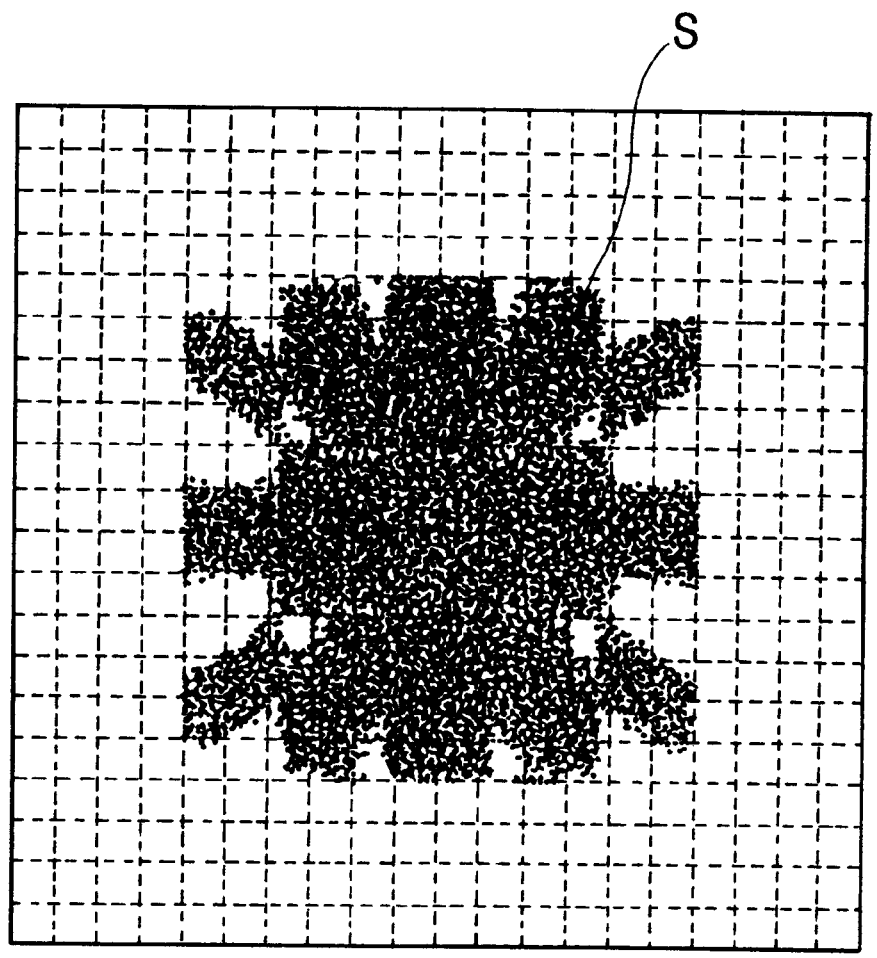
FIG. 8 shows a light source image according to the third embodiment of the present invention.

FIG. 8 shows the light source image S. Since some light beams coming from the light source travel straight through the interior of the integrator 17 and some other light beams are reflected once or several times, the light source image S becomes a set of a plurality of small light source images, as shown in FIG. 8. In an example shown in FIG. 8, a maximum of one reflection takes place in the vertical direction of FIG. 8, and a maximum of two reflections take place in the horizontal direction of FIG. 8. Hence, the light source image S is defined by a 3×5 matrix of small light source images, and each light source image has a nearly rectangular outer shape.

Referring back to FIG. 7, light emanating from the light source image S is reflected by the reflection mirror 5, and is then converted into nearly collimated light by a field lens 7, thus illuminating a reflection liquid crystal panel 9 obliquely from the above.

In the optical system of this embodiment, it is important to form image of the rear end face 17-2 as the light exit surface of the integrator 17 on the liquid crystal panel 9 by the convex lens 18, a focusing lens 20, and the field lens 7. At the rear end face 17-2 of the integrator 17, since light beam components transmitted through or reflected once or several times by the interior of the integrator 17 are superposed each other, color nonuniformity and luminance nonuniformity of the light source are corrected to be nearly uniform. Hence, when this face 17-2 is set at a position conjugate with the liquid crystal panel surface via the convex lens 18, a focusing lens 20, and the field lens 7, luminance nonuniformity on the liquid crystal panel surface can be reduced, and can also be reduced on the screen. Also, if the rear end face 17-2 of the integrator 17 has a rectangular shape roughly similar to the liquid crystal panel and is imaged at an appropriate magnification, it can efficiently illuminate the liquid crystal panel 9.

The light beam which has been modulated and reflected based on image information by the reflection liquid crystal panel 9 leaves the panel 9 obliquely downward, and forms a light source image (second light source image) S' in the neighborhood of the stop 12' of the projection lens 13 by the field lens (optical means) 7. The light beam which has passed through the aperture of the stop 12' is projected onto the screen 15 via the projection lens 13.

As in the above embodiments, a polymer dispersed liquid crystal or polymer network liquid crystal is suitable for the liquid crystal panel.

It is important to note that in the optical system of this embodiment the front end face 17-1 of the integrator 17 is conjugate with the aperture, where the light source image S is to be formed in the vicinity of the reflection mirror 5, via the convex lens 18 and focusing lens 20. Furthermore, the light source image S is formed as the light source image S' in the neighborhood of the stop 12' since it passes through the field lens 7 twice via the reflection liquid crystal panel 9 as in the above embodiment. In the third embodiment of the present invention, the contrast can be successfully improved by inserting the two stops 6' and 12' into the optical system by utilizing the conjugate relation between the front end face 17-1 of the integrator 17 and the light source images S and S' without any influences on the conjugate relation between the rear end face 17-2 of the integrator 17 and the liquid crystal panel.

Figure 9A:
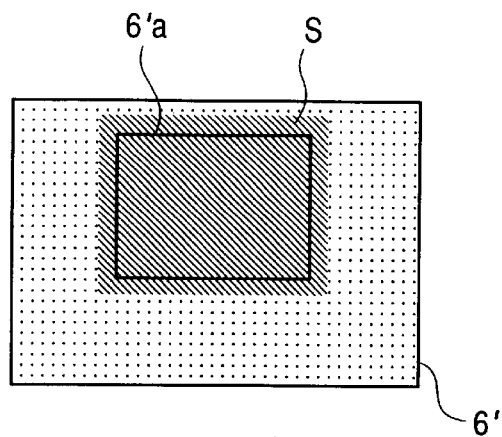
FIGS. 9A, 9B, 9C, and 9D are explanatory views for explaining the relationship between the aperture and light source image according to the third embodiment of the present invention.
Figure 9B:
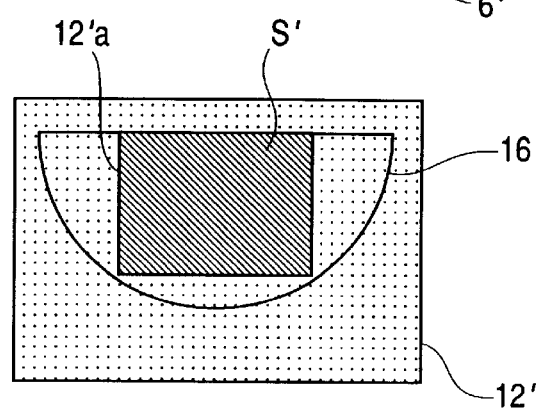

The aforementioned two stops 6' and 12' will be explained in detail below with the aid of FIGS. 9A to 9D. FIG. 9A shows the relationship between an aperture 6'a located in the vicinity of the reflection mirror 5, and the light source image S. On the other hand, FIG. 9B shows the relationship between an aperture 12'a located at the pupil position of the projection lens 13, and the light source image S'. Note that the projection lens 13 has a pupil 16.

Referring to FIG. 9A, the aperture 6'a has a rectangular shape which is roughly similar to the light source image and is set to be smaller than the light source image S, and intercepts the peripheral portion of the light source image S. The size of the aperture 6'a is selected so that the light source image S' has the same size as that of the aperture 12'a in FIG. 9B. Although not shown, if no aperture 6'a is inserted, the light source image S' becomes larger than the aperture 12'a. Ideally, the light source image S' has the same size as that of the predetermined aperture 12'a with the aperture 6'a being not inserted. However, in the design of an actual optical system, the light source image S' is apt to become larger than the aperture 12'a due to the size of the light source, the number of times of reflection in the integrator 17, the size of the entrance of the integrator, and other limitations (e.g., a broad illumination range of the liquid crystal panel must be assured, the optical system must be made compact, and so forth) on the optical system extending from the integrator to the liquid crystal panel. Note that in the third embodiment the aperture 6'a is conjugate with the aperture 12'a as in the second embodiment.

The pupil 16 of the projection lens 13 has a semi-circular shape since its half portion is occupied by the reflection mirror 5. The light source image S' represents a mode in which the liquid crystal panel transmits an incoming light beam without scattering it so as to display white. In case of a mode in which the liquid crystal panel scatters the incoming light beam to display black, the light source image S' becomes sufficiently larger than the aperture 12'a, and little of the entire light beam pass through the aperture 12'a. The peripheral portion of the light source image S is intercepted in advance by the aperture 6'a so that the light source image S' and aperture 12'a have equal sizes. That is, when white is displayed on the liquid crystal panel, all the light beams of the light source image S' pass through the aperture 12'a to contribute to the brightness of the projected image. On the other hand, when the liquid crystal panel displays black, such phenomenon never occurs that some of "a light beam (Sa) focused on the portion outside the aperture 12'a upon displaying white" are scattered to thereby pass through the aperture 12'a. Hence, any drop of illuminance on the screen can be prevented compared to the case wherein no aperture 6'a is inserted, and the contrast can be improved since such light beam is absent.

In FIG. 9B, the size of the aperture 6'a is selected so that the light source image S' has the same size as that of the aperture 12'a. However, in consideration of any positional deviation between the light source image S' and aperture 12'a due to manufacturing errors or the like, the light source image S' is preferably set to have a size that can sufficiently cover the aperture 12'a, i.e., to be slightly larger than the aperture 12'a. With this arrangement, the contrast of the projected image can be satisfactorily improved.

Figure 9C:
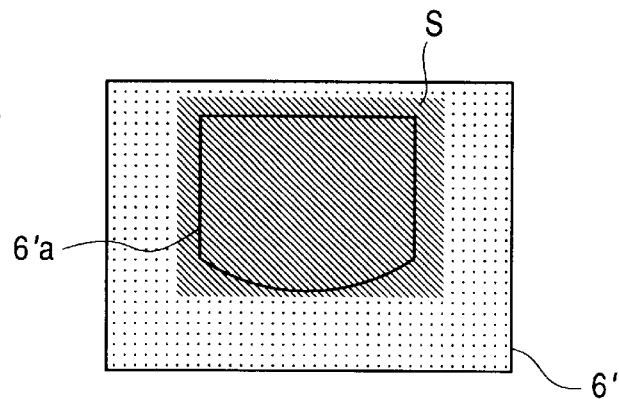
Figure 9D:
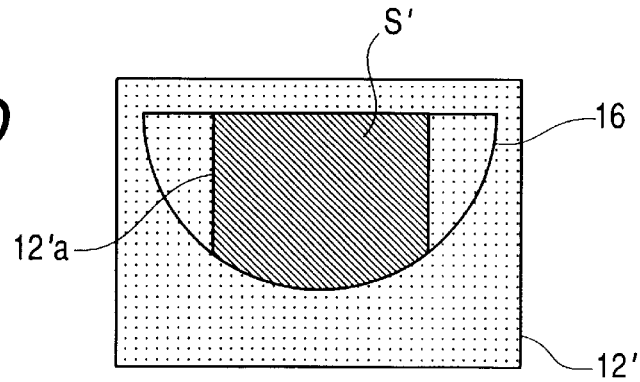

To explain a modification of the third embodiment, FIG. 9C shows the relationship between the aperture 6'a located near the position of the reflection mirror 5 and the light source image S, and FIG. 9D shows the relationship between the aperture 12'a located at the pupil position of the projection lens 13, and the light source image S'.

When the aperture 6'a is set to be smaller than the light source image S to intercept the peripheral portion of the light source image S, as shown in FIG. 9C, the size of the aperture 6'a is selected so that the light source image S' has the same size as that of the aperture 12'a, as shown in FIG. 9D. Although not shown, if no aperture 6'a is inserted, the light source image S' becomes larger than the aperture 12'a. Note that the conjugate relation between the apertures 6'a and 12'a in the third embodiment is the same as that in the second embodiment.

The shape of the aperture 6'a is not limited to a rectangular shape even when the inner surface reflection integrator 17 is used, and must be appropriately considered depending on the shape of a desired aperture 12'a. However, in either case, any drop of illuminance on the screen can be prevented and the contrast can be improved compared to the case wherein no aperture 6'a is inserted.

This embodiment is especially effective when the light source image S' becomes larger than the aperture 12'a or the pupil 16 of the projection lens 13 due to various limitations on the optical system using the integrator. In such case, since the peripheral portion of the light source image S is intercepted by the aperture 6'a in advance so that the light source image S' and aperture 12'a have equal sizes, the contrast alone can be improved without any drop of the illuminance on the screen.

Figure 10:
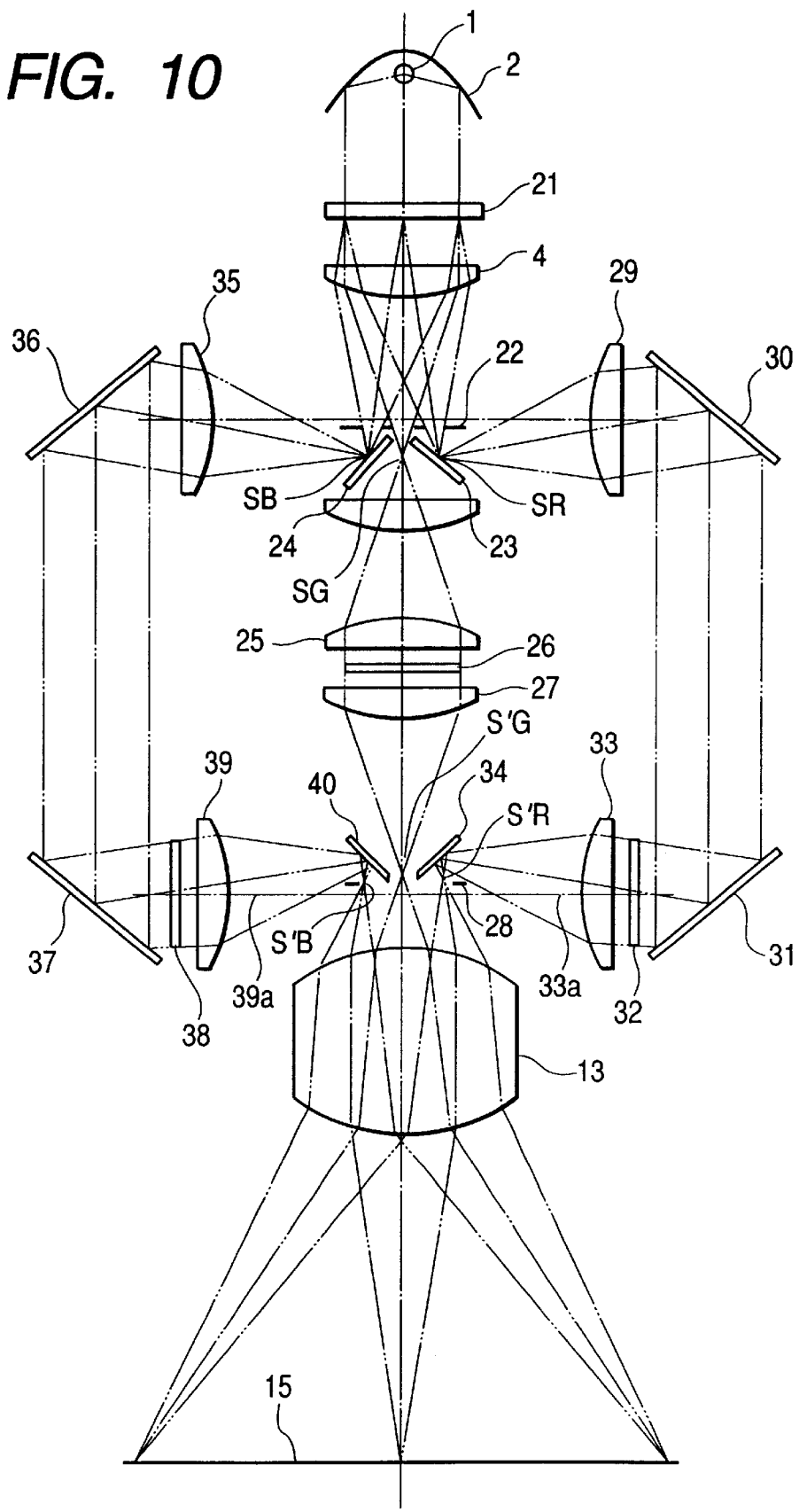
FIG. 10 is a schematic view showing principal part of the fourth embodiment of the present invention.
Figure 11:
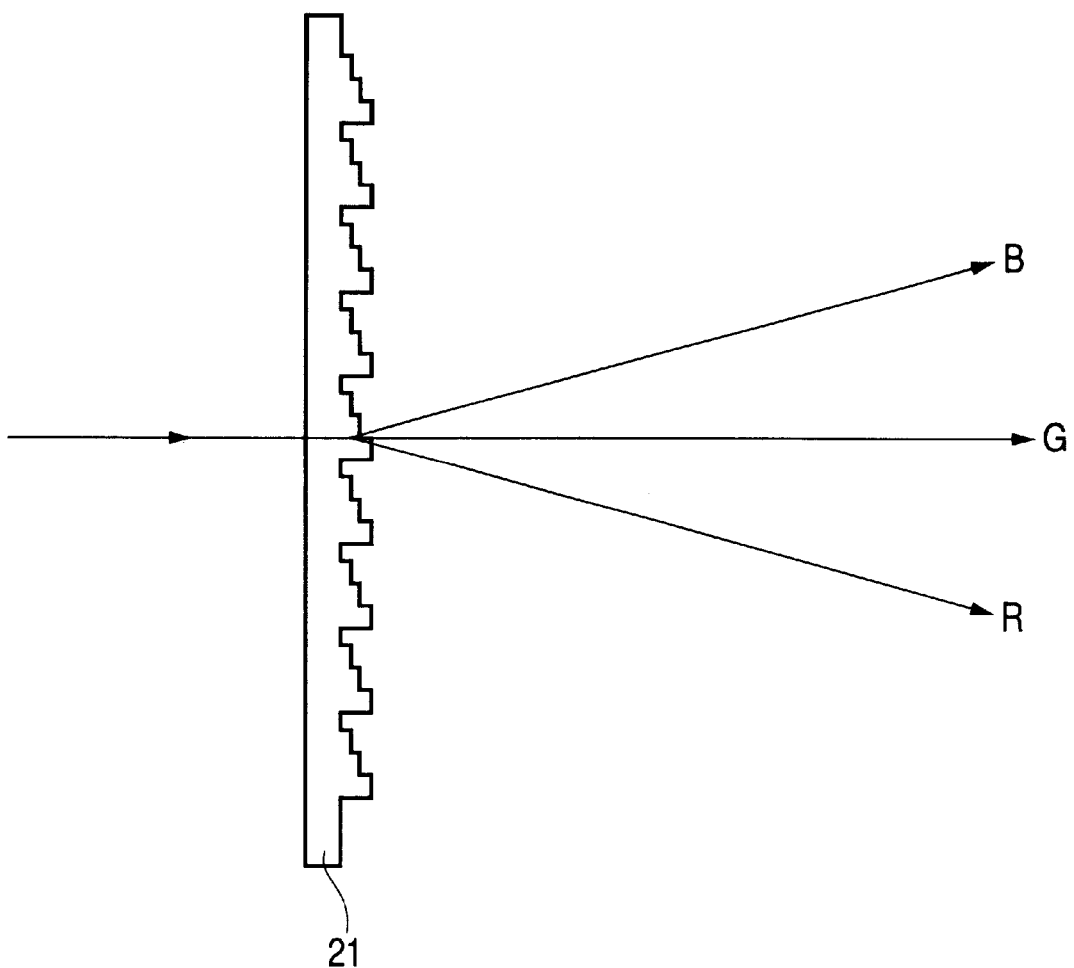
FIG. 11 is an explanatory view of a transmission color-separation diffraction grating suitable for the fourth embodiment of the present invention.

FIG. 10 is a schematic view showing the principal part of the fourth embodiment of the present invention, and FIG. 11 is a partial explanatory view of FIG. 10. In this embodiment, the present invention is applied to a color liquid crystal projector that uses transmission liquid crystal panels (to be also referred to as "liquid crystal" hereinafter) as light modulation elements for forming images.

Referring to FIG. 10, white light W emitted by a light source 1 is reflected by a parabolic mirror 2 to be converted into nearly collimated light beam. The nearly collimated light beam is separated by a color-separation element 21 into light beams corresponding to a plurality of wavelength ranges (e.g., red light (R light), green light (G light), and blue light (B light); to be abbreviated as "R, G, and B light beams" hereinafter).

FIG. 11 is a sectional view of the principal part of the color-separation element 21 of this embodiment. The color-separation element of this embodiment comprises a transmission staircase-like diffraction grating. As shown in FIG. 11, incoming white light W on the diffraction grating is transmitted through and separated into 0th- and ±1st-order diffracted light components having diffraction efficiency peaks in specific, R, G, and B wavelength ranges by the optical path differences of the fine staircase structure that the light W traverses.

Note that in this embodiment a reflection diffraction grating may be used as the color-separation element 21 in place of the transmission diffraction grating.

The color-separation element shown in FIG. 11 separates to obtain the G light beam at the center, and R and B light beams on the two sides of the G light beam. This is to locate the G light beam at the central portion of a stop 28 of a projection optical system (projection lens) 13 and to make the R and B light beams pass through the peripheral portion of the stop 28, so that the aberrations of the projection optical system hardly contribute to the resolution of a projected image, as will be described later. When the G light beam is located at the center in advance by a color-separation optical system, the overall arrangement of the color-separation optical system can be made simple and compact if a color-synthesizing optical system adopts a layout that has the G light beam at the center.

The diffraction grating serving as the color-separation element in FIG. 11 has spectral characteristics with large dependence on the incident angle of a light beam, and the dependence of the color-separation element on the incident angle of a light beam causes color nonuniformity and luminance nonuniformity of illumination. To avoid such color nonuniformity and luminance nonuniformity, this embodiment inserts the diffraction grating in the path of nearly collimated light after the parabolic mirror 2.

Referring back to FIG. 10, the R, G, and B light beams coming from the color-separation element 21 enter a focusing lens (first lens means) 4 at different incident angles, and are focused by the focusing lens 4 to form light source images (first light source images) SR, SG, and SB in the neighborhood of mirrors 23 and 24 which are obliquely placed at given spacings and serve as first deflection means.

Figure 12A:
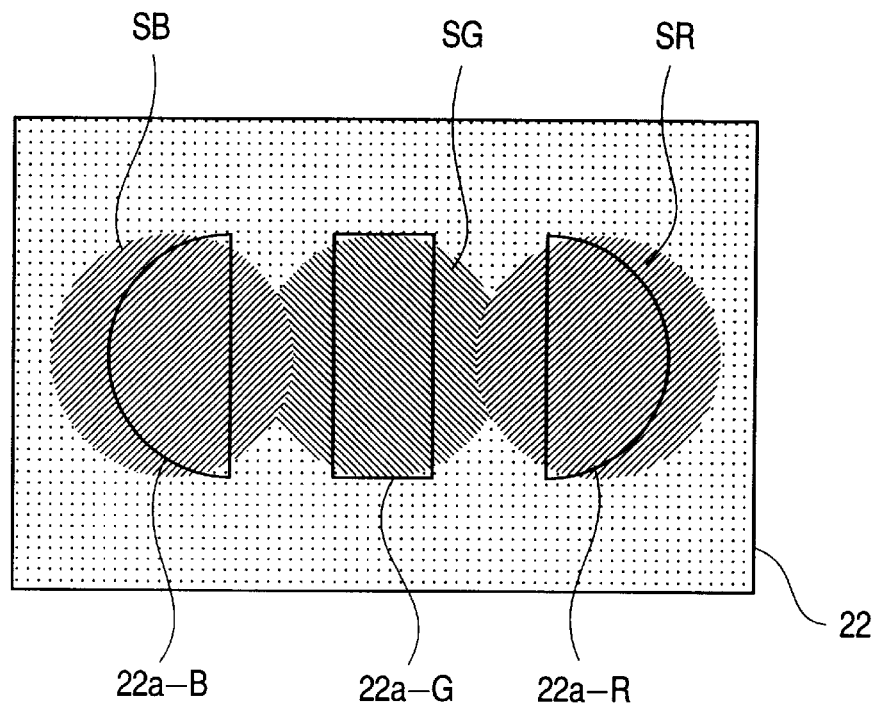
FIGS. 12A and 12B are explanatory views for explaining the relationship between the aperture and light source image according to the fourth embodiment of the present invention.

A stop 22 is placed immediately before the mirrors 23 and 24. FIG. 12A shows the relationship between an aperture 22a of the stop 22 and the light source images SR, SG, and SB.

Of these three color light beams, for example, the G light beam is transmitted through a portion between the mirrors 23 and 24, and is converted into nearly collimated light beam by a field lens (lens system) 25, thus illuminating a transmission liquid crystal panel 26. The light beam modulated by image information on the transmission liquid crystal panel 26 is focused by a field lens (lens) 27 to form a light source image (second light source image) S'G again at a position between mirrors 34 and 40, which are located in the vicinity of a stop 28 of the projection lens 13 serving as the projection optical system, and served as second deflection means.

On the other hand, the R light beam is reflected by the mirror 23, is converted into nearly collimated light by a field lens 29, and illuminates a transmission liquid crystal panel 32 via mirrors 30 and 31. The light beam modulated by image information on the transmission liquid crystal panel 32 is focused by a field lens 33 to form a light source image (second light source image) S'R again near the mirror 34 located in the vicinity of the stop 28 of the projection optical system 13.

Likewise, the B light beam is reflected by the mirror 24, is converted into nearly collimated light by a field lens 35, and illuminates a transmission liquid crystal panel 38 via mirrors 36 and 37. The light beam modulated by image information on the transmission liquid crystal panel 38 is focused by a field lens (lens) 39 to form a light source image (second light source image) S'B again near the mirror 40 located in the vicinity of the stop 28 of the projection optical system 13.

Figure 12B:
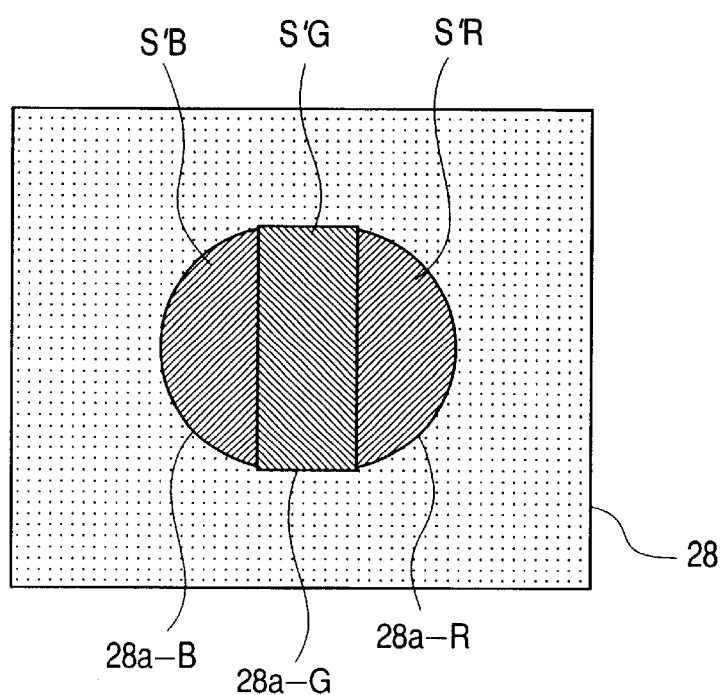

Note that the positional relationship between the stop 28 and the light source images S'R, S'G, and S'B is as shown in FIG. 12B.

The G light beam, and the R and B light beams, are guided to the projection optical system 13 after the G light is transmitted through the position between the mirrors 34 and 40, and the R and B light beams are respectively reflected by the mirrors 34 and 40. The projection optical system 13 synthesizes image information on the individual liquid crystal panels 26, 32, and 38 carried by these light beams into a full-color image, and projects the full-color image on a screen 15.

Note that the field lenses 33 and 39 have a common optical axis (one-dashed chain line) 33a (39a) which is perpendicular to the optical axis of the field lens 27 via the mirrors 34 and 40. That is, when the field lens 33 and liquid crystal panel 32 are folded about the mirror 34, they respectively overlap the field lens 27 and liquid crystal panel 26. Similarly, when the field lens 39 and liquid crystal panel 38 are folded about the mirror 40, they respectively overlap the field lens 27 and liquid crystal panel 26. More specifically, the individual liquid crystal panels 26, 32, and 38 are located at optically equivalent positions with respect to the projection optical system 13, and light beams coming from these liquid crystal panels 26, 32, and 38 pass through different portions of the stop 28 of the projection optical system 13 and are synthesized into a full-color image on the screen 15.

To establish such relationship, the individual liquid crystal panels are located on the optical axes of the corresponding field lens, and the liquid crystal panels 32 and 38 are illuminated with the light beams that have tilts with the optical axes 33a and 39a.

Note that the transmission liquid crystal panels use a polymer dispersed liquid crystal or polymer network liquid crystal as in the above embodiments.

The relationship among the stop 28 of the projection lens 13 and the light source images S'R, S'G, and S'B will be explained below with the aid of FIG. 12B. The stop 28 has a circular shape as in a normal lens, but its pupil is split by the mirrors 34 and 40 into the central pupil for the G light beam and right and left pupils for the R and B light beams, as shown in FIG. 12B. In this embodiment, the color-separation/synthesis optical system is built so that the G light beam is located at the central portion of the stop 28 of the projection lens 13, and the B and R light beams pass through the peripheral portions of the stop. This is for the following reason. That is, the R light beam contributes largely to the resolution since its light intensity coming from the light source is largest and its relative visibility is high. Compared to the R light beam, since the B or R light beam has low relative visibility and contributes less to the resolution, any apparent drop of resolution is negligible even when slight aberrations are produced by the projection lens.

Since the projection lens cannot have an excessively small (bright) f-number in consideration of the contrast of the Schlieren optical system, the light source images S'R, S'G, and S'B are apt to become larger than the three pupils for the individual light beams split by the two mirrors. An optical system that synthesizes colors by splitting the pupil requires considerably lower cost than the color synthesizing optical system using the cross dichroic prism described in the first embodiment of the present invention, but is disadvantageous in the relationship between the sizes of the light source images and pupil, since the pupil is split. However, since the optical system of this embodiment is free from any loss arising from polarization unlike in a conventional TN liquid crystal panel, the screen illuminance can be properly improved even at the expense of the light beam loss at the stop 28. Since the pupil size is reduced by splitting in units of colors, if liquid crystal panels having equivalent scattering performance are used, the contrast of the projected image can be improved compared to the color synthesizing system using the cross dichroic prism.

To further improve the contrast, it is effective to use the aperture 22a according to the present invention. The relationship among the aperture 22a according to the present invention and the light source images SR, SG, and SB will be explained below using FIG. 12A. Referring to FIG. 12A, the light source images SR, SG, and SB, which have been separately formed in units of colors, respectively enter apertures 22a-R, 22a-G, and 22a-B formed in correspondence with the respective colors.

In FIG. 12A, the apertures 22a-R, 22a-G, and 22a-B are set to be smaller than the light source images SR, SG, and SB to intercept the peripheral portions of the corresponding light source images. The sizes of the apertures 22a-R, 22a-G, and 22a-B are selected so that the light source images S'R, S'G, and S'B respectively have the same sizes as those of apertures 28a-R, 28a-G, and 28a-B in FIG. 12B. Although not shown, the light source images S'R, S'G, and S'B have become larger than the apertures 28a-R, 28a-G, and 28a-B, as described above.

Referring to FIG. 12B, the pupil of the projection lens 13 has a circular shape as in a normal lens, but its region is split by the two mirrors 34 and 40. The light source images S'R, S'G, and S'B represent a transparent mode in which the individual liquid crystal panels reflect incoming light beams without scattering them to display white. In case of a scattering mode in which the liquid crystal panels scatter the incoming light beams to display black, the light source images S'R, S'G, and S'B become sufficiently larger than the corresponding apertures 22a-R, 22a-G, and 22a-B, and little of the entire light beams pass through the apertures. Since the peripheral portions of the light source images SR, SG, and SB are intercepted in advance by the corresponding apertures 22a-R, 22a-G, and 22a-B, the sizes of the light source images S'R, S'G, and S'B are equal to those of the apertures 28a-R, 28a-G, and 28a-B. That is, when the liquid crystal panels 26, 32, and 38 display white, all the light beams of the three light source images S'R, S'G, and S'B pass through the corresponding apertures 28a-R, 28a-G, and 28a-B to contribute to the brightness of the projected image. When the liquid crystal panels display black, if the apertures 22a-R, 22a-G, and 22a-B are not inserted, some of "light beams (Sa) focused on the portions outside the apertures 28a-R, 28a-G, and 28a-B upon displaying white" are scattered to thereby pass through the stop 28. According to this embodiment of the invention, however, since the apertures 22a-R, 22a-G, and 22a-B are inserted as explained above, when the liquid crystal panels display black, such penomenon never occurs that some of "light beams (Sa) focused on the portions outside the apertures 28a-R, 28a-G, and 28a-B upon displaying white" are scattered to thereby pass through the stop 28. Therefore, compared to a case wherein no apertures 22a-R, 22a-G, and 22a-B are inserted, the illuminance on the screen is free from any drop, and the contrast can be improved due to the absence of these light beams.

In FIG. 12B, the size of each aperture 22a is selected so that the light source image S' of each color has the same size as that of the corresponding aperture 28a. However, in consideration of any positional deviation between the light source image S' and aperture 28a due to manufacturing errors or the like, the light source image S' for each color is preferably set to have a size that can sufficiently cover the corresponding aperture 28a, i.e., to be slightly larger than the corresponding aperture 28a. With this arrangement, the contrast of the projected image can be satisfactorily improved.

Note that the conjugate relation between the apertures 22a and 28a of the fourth embodiment is the same as that in the second embodiment.

Figures 13A, 13B:
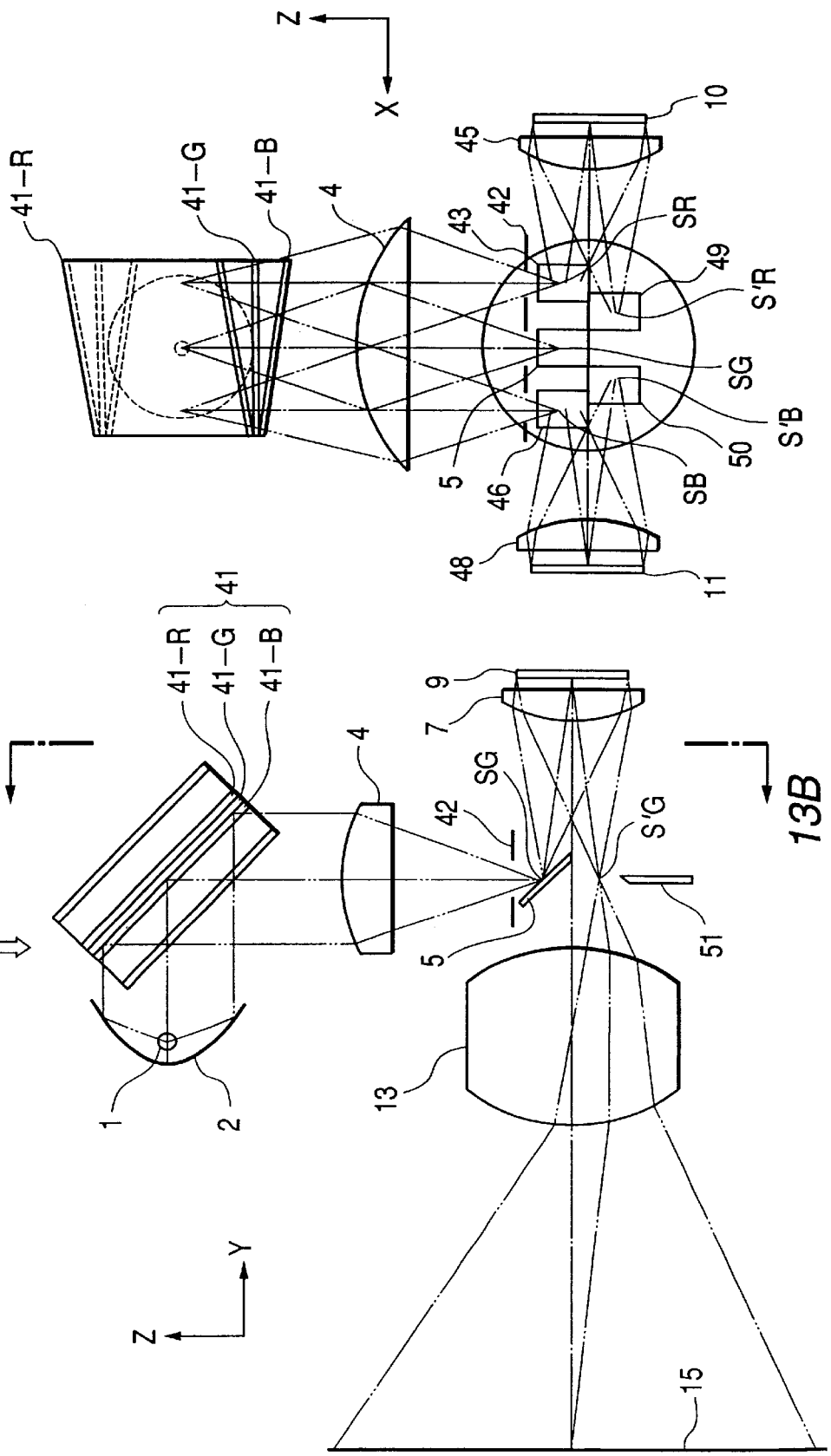
FIG. 13A is a front view of the fifth embodiment of the present invention.
FIG. 13B is a side view of FIG. 13A from a direction of a line 13B—13B in FIG. 13A.
Figure 14B:
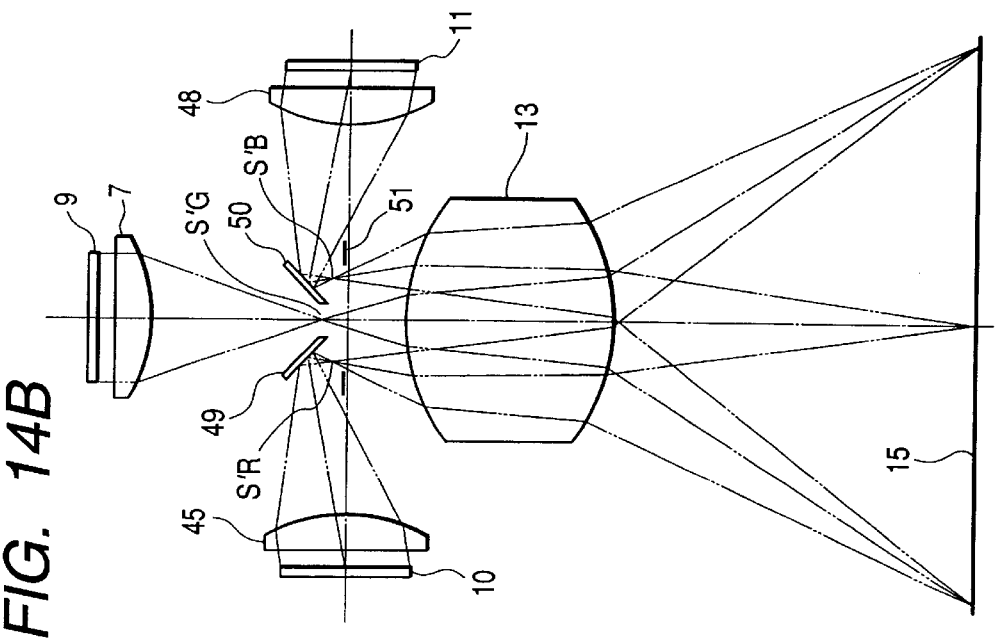
FIGS. 14A and 14B are views for explaining optical systems located above and below the optical axis of a projection lens 13 when
Figure 14A:
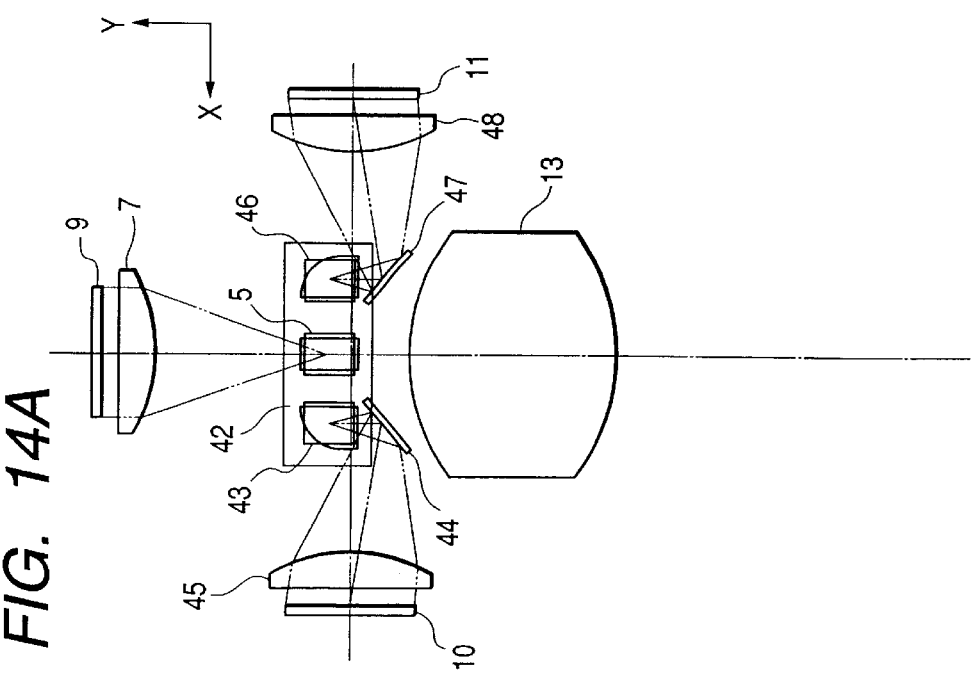
Figure 15:
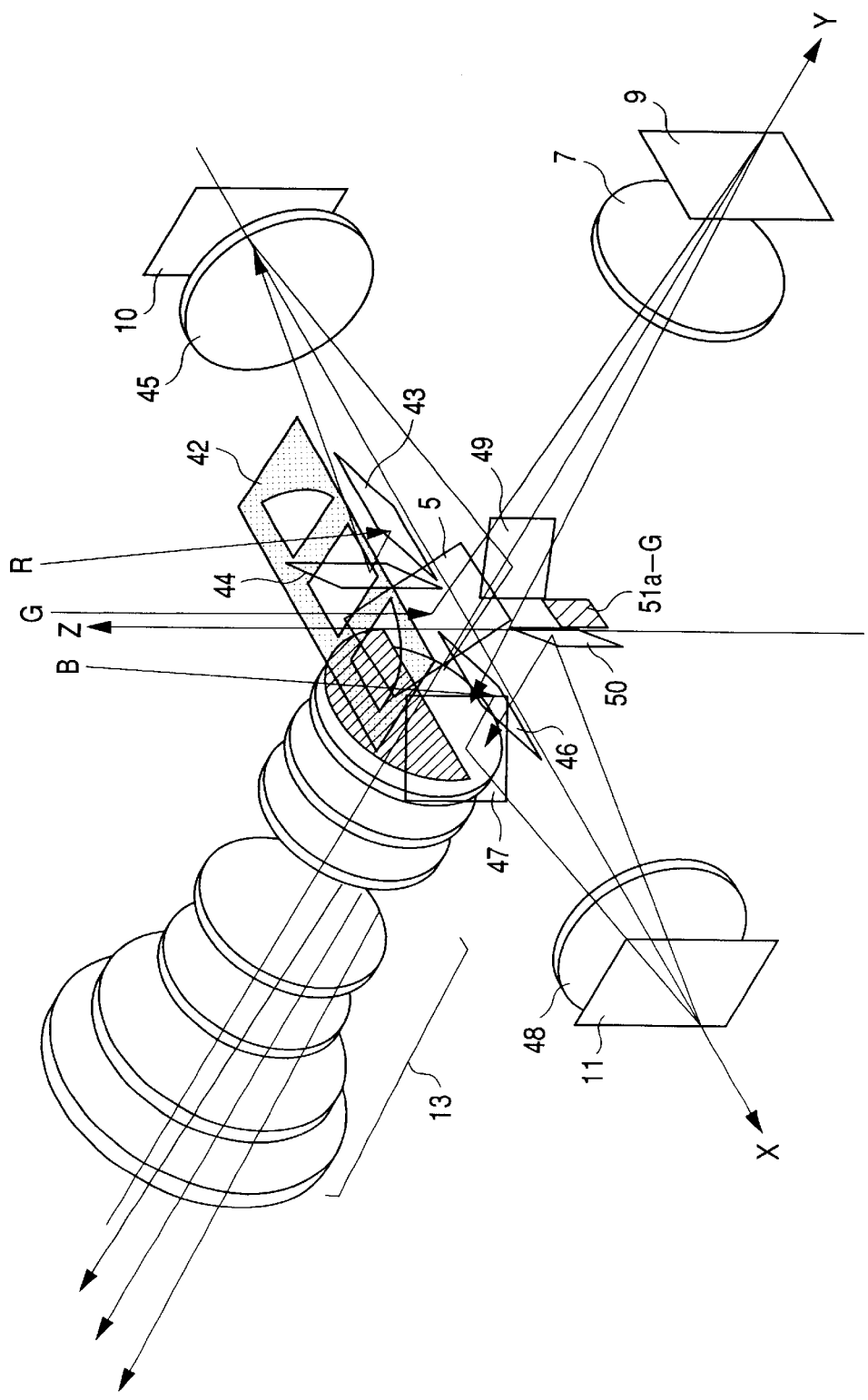
FIG. 15 is a perspective view of the fifth embodiment of the present invention.
Figure 16A:
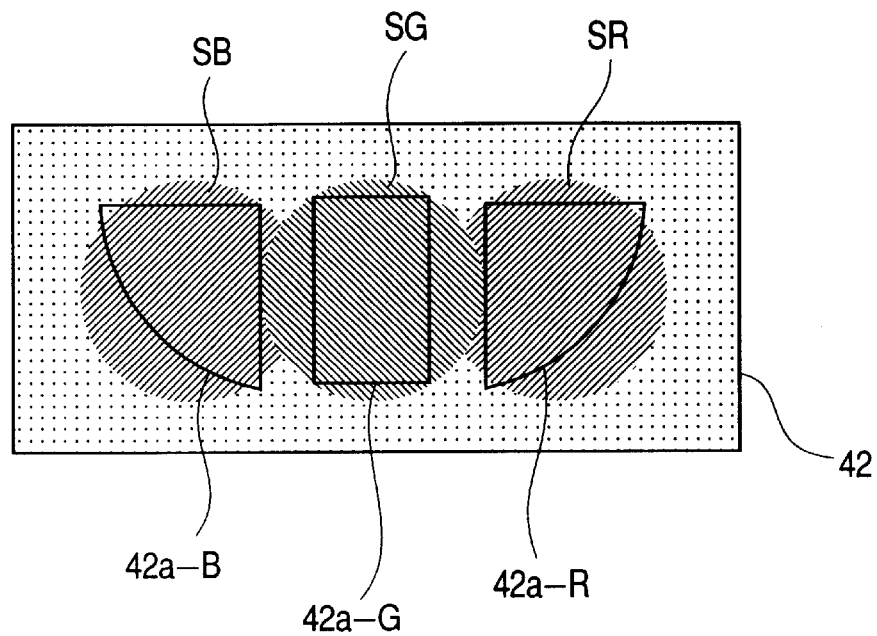
FIGS. 16A and 16B are explanatory views for explaining the relationship between the apertures and light source images according to the fifth embodiment of the present invention.
Figure 16B:
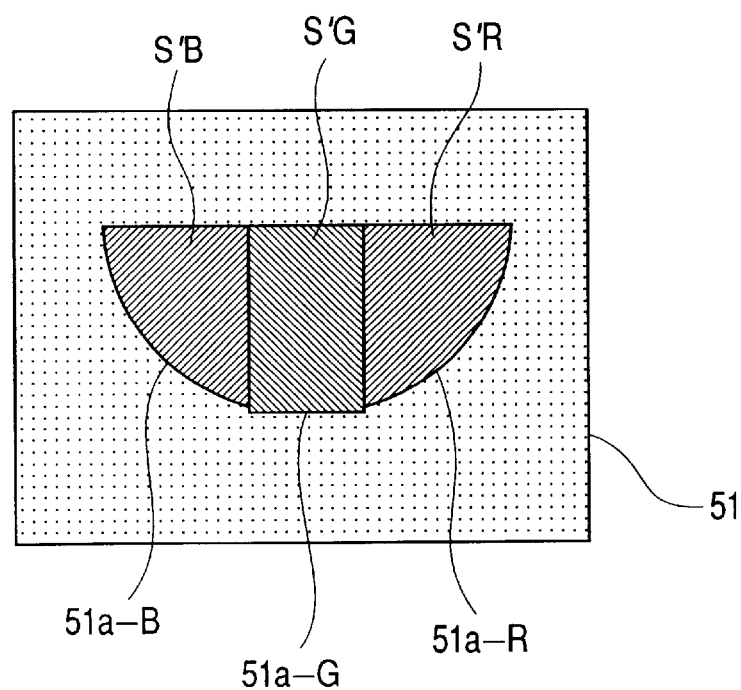
Figure 17B:
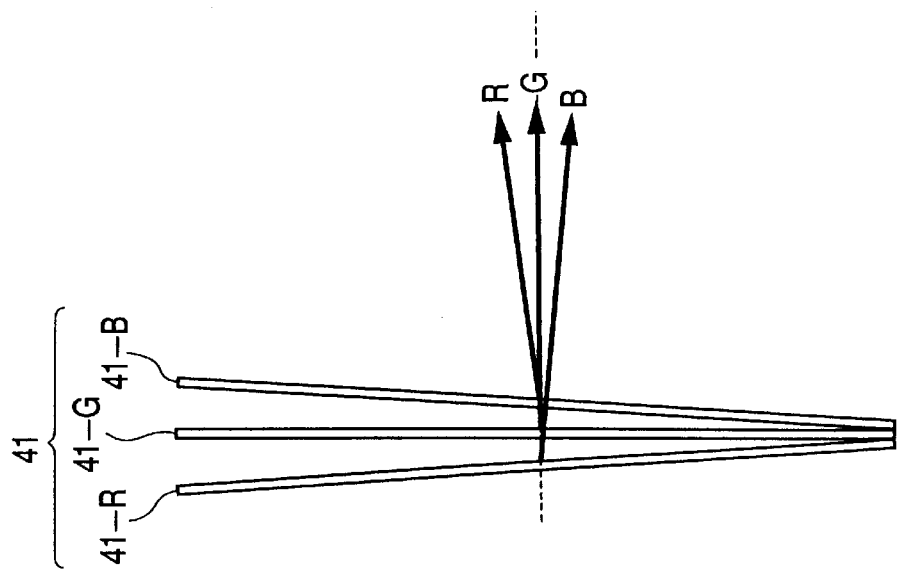
FIGS. 17A and 17B are explanatory views of the layout of dichroic mirrors suitable for the fifth embodiment of the present invention.

FIGS. 13A to 17B are schematic views of the fifth embodiment of the present invention. In this embodiment, the present invention is applied to a color liquid crystal projector using reflection liquid crystal panels. FIG. 13A is a front view of this embodiment, FIG. 13B is a side view of FIG. 13A from the direction of a line 13B—13B in FIG. 13A, and FIG. 14A is a top view of FIG. 13A from the direction of an arrow 14AB in FIG. 13A to explain an optical system located above the optical axis of a projection lens 13 in FIG. 13A. Similarly, FIG. 14B is a view of FIG. 13A from the direction of the arrow 14AB in FIG. 13A to explain an optical system located below the optical axis of the projection lens 13 in FIG. 13A. FIG. 15 is a perspective view for explaining the layout of mirrors in a color-separation/color-synthesizing optical system of this embodiment. FIGS. 16A and 16B are views for explaining the relationship between two apertures and light source images in this embodiment. FIGS. 17A and 17B are views for explaining dichroic mirrors as an example of a color-separation element in this embodiment.

Referring to FIG. 13A, white light emitted by a light source 1 is converted into nearly collimated light by a parabolic mirror 2, and is separated by a color-separation means 41 comprising three dichroic mirrors 41-R, 41-G, and 41-B into three light beams corresponding to the wavelength ranges of R, G, and B colors. The dichroic mirrors 41-R, 41-G, and 41-B are inserted into the optical path of the nearly collimated light after the parabolic mirror 2 so as not to produce any color nonuniformity and luminance nonuniformity of illumination.

Figure 17A:
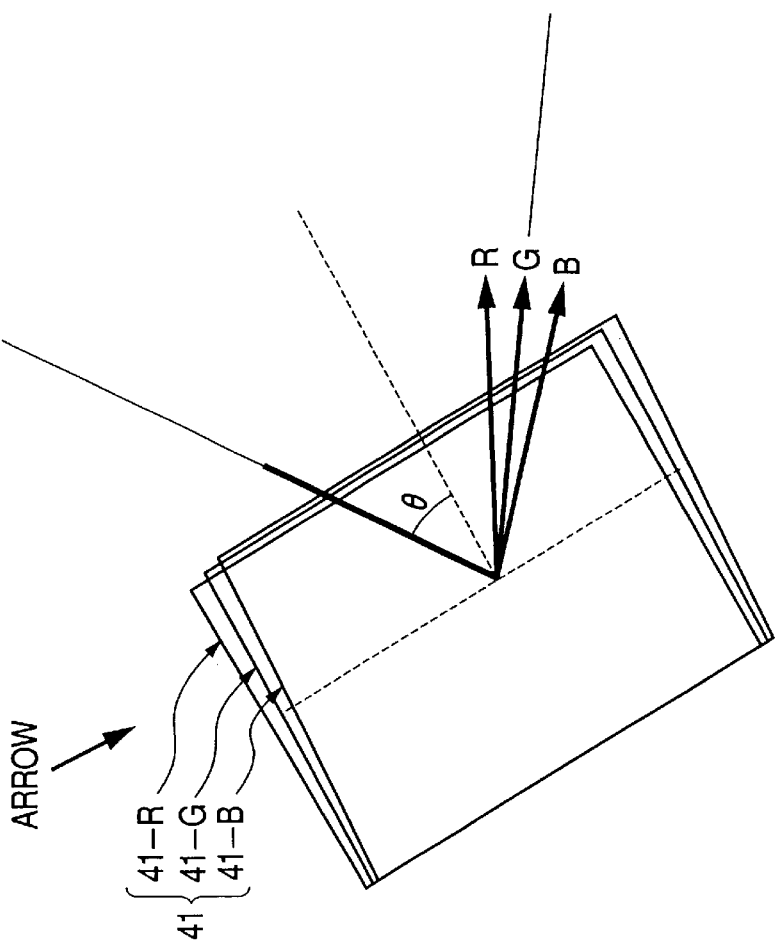
Figure 18:
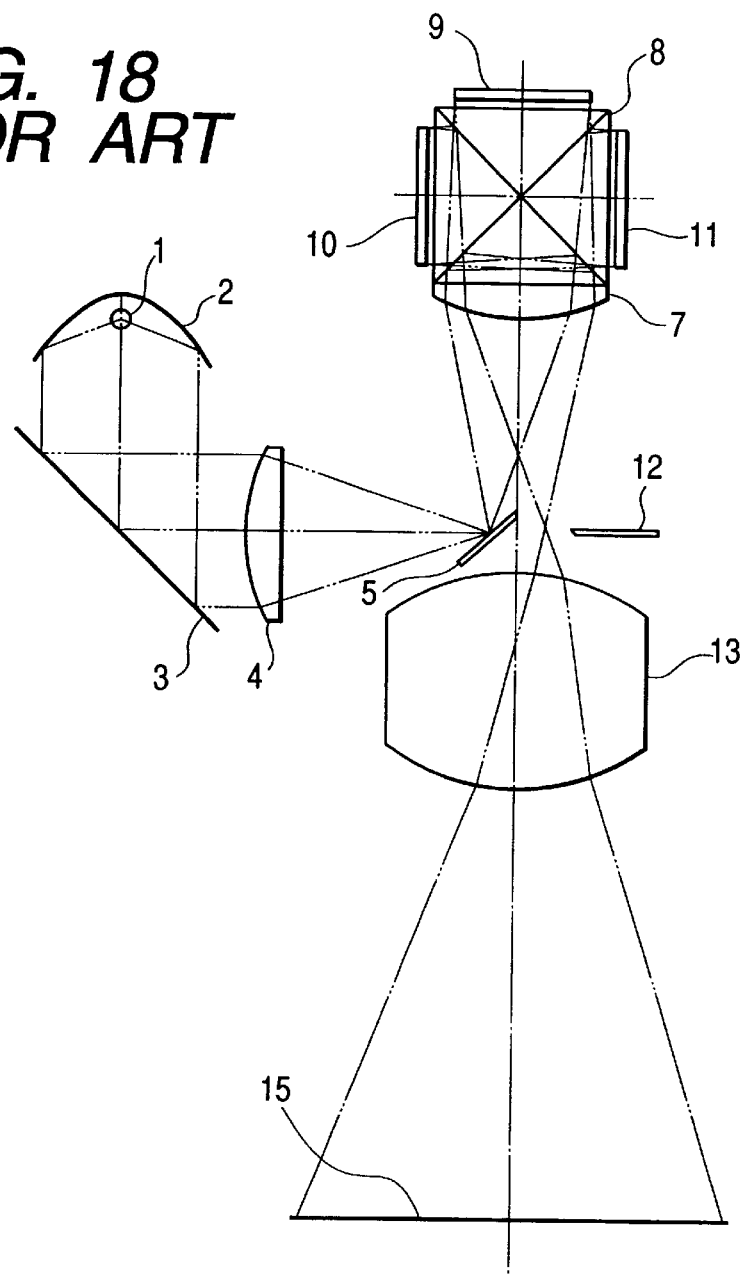
FIG. 18 is a schematic view of a conventional liquid crystal projector.

The arrangement of the three dichroic mirrors will be explained below with reference to FIGS. 17A and 17B. FIG. 17B is a sectional view of the three dichroic mirrors when viewed from the direction of an arrow in FIG. 17A. The dichroic mirror 41-B has spectral characteristics for reflecting a light beam in the blue wavelength range, and transmitting green and red light beams. The dichroic mirror 41-G has spectral characteristics for reflecting a light beam in the green wavelength range, and transmitting blue and red light beams. The dichroic mirror 41-R has spectral characteristics for reflecting a light beam in the red wavelength range, and transmitting an orange light beam. Since these dichromic mirrors are placed to have tilts, their reflected light is separated into three color light beams corresponding to the wavelength ranges of R, G, and B. Referring to FIG. 17A, the separation directions of the individual light beams are perpendicular to a plane defined by the incident and reflection planes of the G light beam, as shown in FIG. 17B.

Referring back to FIG. 13A, the R, G, and B color light beams coming from the three dichroic mirrors enter a focusing lens 4 to make different angles with a direction perpendicular to the paper of FIG. 13A. The focusing lens 4 forms light source images in the vicinity of mirrors 43 and 5 and a mirror 46, which are obliquely placed near a stop 51 of a projection lens 13 with given spacings. Immediately before (on the light source 1 of) the mirrors 5, 43, and 46, a stop 42 according to the present invention is inserted. Three apertures 42a of the stop 42 and light source images SR, SG, and SB have a relationship shown in FIG. 16A, which will be described in detail later.

In the section of FIG. 13A, the G light beam is present. The G light beam is converted into nearly collimated light by a field lens 7 after it is reflected by the mirror 5, and illuminates a reflection liquid crystal panel 9 obliquely from the above. The light beam modulated by image information is reflected obliquely downward by the reflection liquid crystal panel 9, and is focused by the field lens 7 again to form a light source image S'G at a position between mirrors 49 and 50 placed in the vicinity of a stop 51 of the projection lens 13. The stop 51 is set to occupy nearly half the pupil of the projection lens 13.

The R and B light beams will be explained below with the aid of FIG. 13B and FIGS. 14A and 14B. The R light beam is reflected in turn by the mirror 43 and a mirror 44, and is converted into nearly collimated light by a field lens 45 to illuminate a reflection liquid crystal panel 10. The illumination direction to the liquid crystal coincides with that from obliquely above as in the G light beam in the direction of section in FIG. 13B, and that from obliquely below in the direction of section in FIG. 14A. The light beam modulated by image information is reflected by the reflection liquid crystal panel 10 in a direction opposite to the incoming direction of the illumination light, and forms a light source image S'R again near the mirror 49 placed in the vicinity of the stop 51 of the projection lens 13 via the field lens 45. Likewise, the B light beam is reflected in turn by the mirror 46 and a mirror 47, and is converted into nearly collimated light by a field lens 48, thus illuminating a reflection liquid crystal panel 11. The illumination direction to the liquid crystal panel coincides with that from obliquely above as in the G light beam in the direction of section in FIG. 13B, and that from obliquely below in the direction of section in FIG. 14A. The light beam modulated by image information is reflected by the reflection liquid crystal panel 11 in a direction opposite to the incoming direction of the illumination light, and forms a light source image S'B again near the mirror 50 placed in the vicinity of the stop 51 of the projection lens 13 via the field lens 48. The stop 51 and light source images S'R, S'G, and S'B have a relationship shown in FIG. 16B, which will be described in detail later.

The G light beam is transmitted through a position between the mirrors 49 and 50, and the R and B light beams are respectively reflected by the mirrors 49 and 50. These light beams are synthesized into a full-color image by the projection lens 13, and the full-color image is projected onto a screen 15.

The layout of the field lenses 7, 45, and 48, liquid crystal panels 9, 10, and 11, and the mirrors 49 and 50, and how to illuminate the liquid crystal panels will be briefly described below. The field lenses 45 and 48 have a common optical axis (indicated by one-dashed chain lines in FIG. 13B and FIGS. 14A and 14B) perpendicular to the optical axis of the field lens 7. In this embodiment, the mirrors 49 and 50 are placed to make an angle of 45° with the common optical axis, and the angle the two mirrors make is 90°. When the mirror surfaces of the mirrors 49 and 50 are extended in the directions of the projection lens, they intersect each other at the intersection between the common optical axis of the field lenses 45 and 48, and that of the field lens 7. That is, when the field lens 45 and liquid crystal panel 10 are folded about the mirror 49, they respectively overlap the field lens 7 and liquid crystal panel 9. Similarly, when the field lens 48 and liquid crystal panel 11 are folded about the mirror 50, they respectively overlap the field lens 7 and liquid crystal panel 9. The individual liquid crystal panels are placed at optically equivalent positions with respect to the projection lens 13, and light beams coming from the individual liquid crystal panel pass through different portions of an aperture 51a of the stop 51 of the projection lens 13 and are synthesized to display a full-color image on the screen.

In order to establish a relationship that makes the positions of the individual liquid crystal panels equal to each other, and makes light beams pass through different portions of the stop 51 of the projection lens 13, at least the liquid crystal panels 10 and 11 must be illuminated with light beams which have tilts with the optical axis in the X-Y plane. In order to construct a Schlieren optical system using reflection liquid crystal panels, the liquid crystal panels are illuminated with light beams which have tilts with the optical axis in the Z-X plane, as also shown in FIG. 13B. Since the liquid crystal panels and field lenses are located on the common optical axes, as described above, distortion can be minimized and pixels at all the corners of the screen can be matched, thus obtaining a high-resolution projected image.

FIG. 15 stereoscopically illustrates the mirrors 5, 43, 44, 46, and 47 used in the color-separation illumination optical system, and the mirrors 49 and 50 used in the color-synthesizing optical system. The positional relationship among the mirrors can be understood from FIG. 15. Note that optical components from the light source 1 to the focusing lens 4 are not shown. The three-color, R, G, and B light beams strike the mirrors via the stop 42 placed in front of the mirrors.

Note that the reflection liquid crystal panels use a polymer dispersed liquid crystal or polymer network liquid crystal as in the above embodiments.

The relationship between the stop 51 of the projection lens 13 and the light source images S'R, S'G, and S'B will be explained below with reference to FIG. 16B. The stop 51 has a semi-circular shape since the upper half of its pupil is occupied by the color-separation mirrors 5, 43, and 46. In addition, the pupil is split by the mirrors 49 and 50 into the central pupil for the G light beam and the right and left pupils for the R and B light beams, respectively, as shown in FIG. 16B. In the present invention, as in the fourth embodiment, the color separation/synthesizing optical system is constructed so that the G light beam passes through the central portion of an aperture 51a of the stop 51 of the projection lens 13, and the B and R light beams pass through the peripheral portions of the aperture 51a. This is for the following reason. That is, the G light beam contributes largely to the resolution since its light intensity coming from the light source is largest and its relative visibility is high. Compared to the R light beam, since the B or R light beam has low relative visibility and contributes less to the resolution, any apparent drop of resolution is negligible even when slight aberrations are produced by the projection lens.

In the optical system of this embodiment, since the semi-circular pupil is split into three portions by the two mirrors, the light source images S'R, S'G, and S'B are apt to become larger than the three pupils for the individual light beams. An optical system that synthesizes colors by splitting the pupil requires considerably lower cost than the color synthesizing optical system using the cross dichroic prism described in the first embodiment, but is disadvantageous in the relationship between the sizes of the light source images and pupil, since the pupil is split. However, since the optical system of this embodiment is free from any loss arising from polarization unlike in a conventional TN liquid crystal panel, and the reflection liquid crystal panel can assure a higher aperture ratio than a transmission liquid crystal panel, the screen illuminance can be properly improved even at the expense of the light intensity loss at the stop 51. Since the pupil size is reduced by splitting in units of colors, if liquid crystal panels having equivalent scattering performance are used, the contrast of the projected image can be improved compared to the color synthesizing system using the cross dichroic prism.

In this embodiment, an aperture 42a is inserted to further improve the contrast. The relationship between the aperture 42a and light source images SR, SG, and SB will be explained below with reference to FIG. 16A. The light source images SR, SG, and SB formed by the R, G, and B separated light beams are limited by apertures 42a-R, 42a-G, and 42a-B formed in correspondence with the respective color light beams in FIG. 16A.

Referring to FIG. 16A, the apertures 42a-R, 42a-G, and 42a-B are set to be smaller than the corresponding light source images SR, SG, and SB to intercept the peripheral portions of the respective light source images. The sizes of the apertures 42a-R, 42a-G, and 42a-B are selected so that the light source images S'R, S'G, and S'B have the same sizes as those of apertures 51a-R, 51a-G, and 51a-B in FIG.

16B. Although not shown, when the apertures 42*a* are not inserted, the light source images S'R, S'G, and S'B become larger than the apertures 51*a*-R, 51*a*-G, and 51*a*-B, as described above.

The pupil of the projection lens 13 has a semi-circular shape, and is split into three portions by the two mirrors 49 and 50. The light source images S'R, S'G, and S'B represent a transparent mode in which the individual liquid crystal panels reflect incoming light beams without scattering them to display white. In case of a scattering mode in which the liquid crystal panels scatter the incoming light beams to display back, the light source images become sufficiently larger than the corresponding apertures, and little of the entire light beams pass through the apertures. Since the peripheral portions of the light source images SR, SG, and SB are intercepted in advance by the corresponding apertures 42*a*-R, 42*a*-G, and 42*a*-B, the sizes of the light source images S'R, S'G, and S'B are set to be equal to those of the apertures 51*a*-R, 51*a*-G, and 51*a*-B. That is, when the liquid crystal panels display white, all the light beams of the three light source images S'R, S'G, and S'B pass through the corresponding apertures 51*a*-R, 51*a*-G, and 51*a*-B to contribute to the brightness of the projected image. When the liquid crystal panels display black, if the stop 42 is not inserted, some of "light beams (Sa) focused on the portions outside the apertures 51*a*-R, 51*a*-G, and 51*a*-B upon displaying white" are scattered to pass through the stop 51. According to this embodiment of the invention, however, since the stop 42 is inserted as explained above, when the liquid crystal panels display black, such phenomenon never occurs that some of "light beams (Sa) focused on the portions outside the apertures 51*a*-R, 51*a*-G, and 51*a*-B upon displaying white" are scattered to pass through the stop 51. Therefore, compared to a case wherein no stop 42 is inserted, the illuminance on the screen is free from any drop, and the contrast can be improved due to the absence of these some light components.

In FIG. 16B, the size of each aperture 42*a* is selected so that the light source image S' of each color has the same size as that of the corresponding aperture 51*a*. However, in consideration of any positional deviation between the light source image S' and aperture 51*a* due to manufacturing errors or the like, the light source image S' for each color is preferably set to have a size that can sufficiently cover the corresponding aperture 51*a*, i.e., to be slightly larger than the corresponding aperture 51*a*. With this arrangement, the contrast of the projected image can be satisfactorily improved.

Note that the conjugate relation between the apertures 42*a* and 51*a* of the fifth embodiment is the same as that in the second embodiment.

When the respective elements are set as described above, a projection apparatus suitable for a high-resolution liquid crystal projector such as a monitor of a computer, which can project image information based on an optical modulation element such as a liquid crystal panel onto a predetermined surface as a monochrome or full-color image with high contrast, can be achieved.

When an "aperture of an illumination system placed at a position conjugate with that of a projection lens" is applied to the Schlieren optical system, the contrast of the projected image can be improved without any drop of the illuminance on the screen. Also, the "aperture of the illumination system placed at the position conjugate with that of the projection lens" can improve the contrast of the projected image either in combination with a transmission liquid crystal panel or a reflection liquid crystal panel. When this aperture is combined with a color-synthesizing optical system which splits the pupil of the projection lens by mirrors, a projected image with both high resolution and contrast can be obtained, and the optical system can be simplified.

What is claimed is:

1. A projection apparatus which guides a light beam emitted by a light source through a focusing lens to at least one light modulation element for forming an image, and projects the light beam coming from said light modulation element onto a plane by a projection lens, wherein a first stop is located at a position optically conjugate with a position of a second stop of said projection lens to intercept some light components of the light beam emitted by said light source, the light beam enters the focusing lens and focuses on the first stop, wherein an aperture of the first stop is selected so that a light source image passing through the second stop is the same size as an aperture of the second stop, and wherein said source image falls within a pupil of the projection lens.

2. A projection apparatus which guides a light beam emitted by a light source to at least one light scattering modulation element for forming an image, and projects the light beam coming from said light scattering modulation element onto a plane by a projection lens, comprising: first optical means for receiving and focusing the light beam on a stop means before interception by the stop means, and forming an image of said light source as a first light source image; and second optical means for imaging the light beam coming from said light scattering modulation element illuminated with light emanating from the first light source image to form a second light source image, wherein the second optical means is positioned in the vicinity of an aperture of a stop of said projection lens and a peripheral portion of the first light source image is intercepted by the stop means located at a position optically conjugate with a position of the stop of said projection lens, wherein an aperture of the stop means is selected so that a light source image passing through the stop of said projection lens is the same size as an aperture of the stop of said projection lens, and wherein said source image falls within a pupil of the projection lens.

3. A projection apparatus, which has color-separation means for separating a white light beam emitted by a light source into a plurality of light beams corresponding to different wavelength ranges, optical means for guiding the plurality of light beams to a plurality of light modulation elements for forming images corresponding to the respective wavelength ranges, synthesizing means for synthesizing the light beams coming from said plurality of light modulation elements, and a projection lens for projecting the light beam synthesized by said synthesizing means onto a plane, said projection apparatus comprising: first optical means for focusing the light beam on a first stop means, and for forming images of said light source as first light source images; and second optical means for imaging light beams coming from said plurality of light modulation elements illuminated with light beams emanating from the first light source images to re-form the first light source images into second light source images at or in the vicinity of a second stop means of said projection lens via said synthesizing means, wherein peripheral portions of the first light source images are intercepted by the first stop means located in coordination with the second stop means, wherein an aperture of the first stop is selected so that a light source image passing through the second stop is the same size as an aperture of the second stop, and wherein said source image falls within a pupil of the projection lens.

4. A projection apparatus comprising: color-separation means for separating a white light beam emitted by a light source into a plurality of color light beams corresponding to different wavelength ranges; first lens means for focusing the color light beams coming from said color-separation means on stops and imaging the color light beams coming from said color-separation means to form first light source images of said light source; deflection means, located in the vicinity of the imaging position of said first lens means, for deflecting and guiding the light beams to a plurality of light modulation elements for forming images corresponding to the respective wavelength ranges; second lens means for re-imaging the color light beams from said plurality of light modulation elements to form second light source images of said light source; synthesizing means for deflecting at least one of the light beams coming from said plurality of light modulation elements, and synthesizing the deflected light beam with the remaining light beams; and a projection lens for projecting the light beams modulated by said plurality of light modulation elements onto a plane, wherein the second light source images are formed by the second lens means at or in the vicinity of a stop position of said projection lens, said synthesizing means is placed adjacent to the stop position of said projection lens to split an aperture thereof, and peripheral portions of the first light source images for the respective colors are intercepted by the stops, wherein said stops are provided in coordination with the stop position for the respective color light beams, wherein apertures of the stops are selected so that a light source image passing through the stop is the same size as an aperture of the stop position for the respective color light beams, and wherein said source image falls within a pupil of the projection lens.

5. A projection apparatus, which has a light source, focusing means for focusing a light beam emitted by said light source, light guiding means, having first and second end faces, for receiving the light beam at the first end face and outputting the light beam from the second end face, said light guiding means being constructed by reflection surfaces which connect the first and second end faces, and reflecting and guiding at least a part of the light beam received from the first end face to the second end face, a projection lens for projecting the image of a light modulation element onto a screen, and means for focusing and guiding the light beam modulated by said light modulation element on an aperture of a stop of said projection lens, wherein the first end face is located in the vicinity of said focusing means, said apparatus further has first image means for forming an image at the first end face to generate a first light source image, second image means for imaging the first light source image as a second light source image in the vicinity of the stop of said projection lens, and third image means for setting the second end face at a position conjugate with said light modulation element, and a peripheral portion of the first light source image is intercepted by stop means located in coordination with the stop of said projection lens, wherein an aperture of the stop means is selected so that a light source image passing through the stop of said projection lens is the same size as an aperture of the stop of said projection lens, and wherein said source image falls within a pupil of the projection lens.

6. A projection apparatus which guides a light beam coming from an illumination system to at least one light scattering modulation element for forming an image, and projects the light beam coming from said light scattering modulation element onto a plane via a projection lens, wherein the light beam is first focused on a stop means and then a peripheral portion of the light beam is intercepted by the stop means inserted in said illumination system in coordination with an aperture of a stop of said projection lens, wherein an aperture of the stop means is selected so that a light source image passing through the stop of said projection lens is the same size as an aperture of the stop of said projection lens, and wherein said source image falls within a pupil of the projection lens.

7. A projection apparatus which guides a light beam coming from an illumination system to at least one light scattering modulation element for forming an image, and projects the light beam coming from said light scattering modulation element onto a plane via a projection lens, wherein an image of a light source in said illumination system is formed as a first light source image by first optical means, the light beam emanating from the first light source image is guided to said light scattering modulation element by at least one reflection mirror, wherein the light beam enters the first optical means before the at least one reflecting mirror, the light beam coming from said light scattering modulation element is formed as a second light source image at or in the vicinity of a position of an aperture of a stop of said projection lens by second optical means, and a peripheral portion of the first light source image is focused on and intercepted by stop means inserted in said illumination system in coordination with the aperture of the stop of said projection lens, wherein an aperture of the stop means is selected so that a light source image passing through the stop of said projection lens is the same size as an aperture of the stop of said projection lens, and wherein said source image falls within a pupil of the projection lens.

8. A projection apparatus which color-separates a white light beam coming from an illumination system into a plurality of color light beams by color-separation means, guides the plurality of color-separated light beams to light modulation elements provided for the respective color light beams to form images, synthesizes the light beams coming from said light modulation elements by synthesizing means, and projects the light beam synthesized by said synthesizing means via a projection lens, wherein an image of a light source in said illumination system is formed by first optical means as a first light source image, the light beam emanating from the first light source image is guided to said light modulation elements, light beams coming from said light modulation elements are formed by second optical means as a second light source image at or in the vicinity of a position of an aperture of a stop of said projection lens via said synthesizing means, and a peripheral portion of the first light source image is focused on and intercepted by stop means inserted in said illumination system in coordination with the aperture of the stop of said projection lens, wherein an aperture of the stop means is selected so that a light source image passing through the stop of said projection lens is the same size as the aperture of the stop of said projection lens, and wherein said source image falls within a pupil of the projection lens.

9. A projection apparatus which color-separates a white light beam coming from a light source of an illumination system into a plurality of color light beams by color-separation means, forms first light source images of the respective color light beams by first optical means, guides light beams emanating from the first light source images to light modulation elements provided for the respective color light beams using deflection means, images the light beams coming from said light modulation elements as second light source images of the respective color light beams by second optical means, and projects the light beams emanating from the second light images via a projection lens, wherein synthesizing means is located at or in the vicinity of a stop of said projection lens to split an aperture thereof, at least one of the light beams from said plurality of light modulation elements are deflected toward said projection lens, and stop means for the respective color light beams are inserted in said illumination system in coordination with the aperture of the stop of said projection lens to intercept peripheral portions of the first light source images, wherein an aperture of the stop means is selected so that a light source image passing through the stop of said projection lens is the same size as an aperture of the stop of said projection lens, and wherein said source image falls within a pupil of the projection lens.

10. A projection apparatus which guides a light beam coming from an illumination system to at least one light modulation element for forming an image, and projects the light beam coming from said light modulation element onto a plane via a projection lens, wherein said illumination system has a rod integrator with an inner reflecting surface, an image of a light source in said illumination system is formed at an entrance end face of said rod integrator, an image of the entrance end face of said rod integrator is formed by said first optical means as a first light source image, a light emanating from the first light source image is guided to said light modulation element, the light beam coming from said light modulation element is imaged by second optical means as a second light source image at or in the vicinity of a position of an aperture of a stop of said projection lens, an exit end face of said rod integrator is conjugate with said light modulation element, and a peripheral portion of the first light source image is focused on and intercepted by stop means inserted in said illumination system in coordination with the aperture of the stop of said projection lens, wherein an aperture of the stop means is selected so that a light source image passing through the second stop is the same size as an aperture of the stop of said projection lens, and wherein said source image falls within a pupil of the projection lens.

11. An apparatus according to claim 1, wherein said light modulation element comprises a transmission liquid crystal panel using a polymer dispersed liquid crystal.

12. An apparatus according to claim 1, wherein said light modulation element comprises a reflection liquid crystal panel using a polymer dispersed liquid crystal.

13. An apparatus according to claim 1, wherein said light modulation element comprises a transmission liquid crystal panel using a polymer network liquid crystal.

14. An apparatus according to claim 1, wherein said light modulation element comprises a reflection liquid crystal panel using a polymer network liquid crystal.

15. An apparatus according to claim 3, wherein said color-separation means for separating the white light beam emitted from said light source into the plurality of light beams corresponding to the different wavelength ranges comprises a color-separation diffraction grating.

16. An apparatus according to claim 3, wherein said color-separation means for separating the white light beam emitted from said light source into the plurality of light beams corresponding to the different wavelength ranges comprises a plurality of dichroic mirrors.

17. An apparatus according to claim 3, wherein said synthesizing means comprises a cross dichroic prism.

18. An apparatus according to claim 4, wherein said synthesizing means comprises a plurality of mirror means for reflecting the light beam.

19. An apparatus according to claim 4, wherein said deflection means comprises a plurality of mirror means for reflecting the light beam.

20. An apparatus according to claim 1, wherein said projection lens includes at least one spherical lens.

21. An apparatus according to claim 2, wherein said projection lens shares at least a portion of said second optical means.

22. An apparatus according to claim 4, wherein said projection lens shares at least a portion of said second lens means.

23. An apparatus according to claim 5, wherein said projection lens shares at least portions of said second and third image means.

24. An apparatus according to claim 2, wherein the stop of said projection lens comprises a variable stop, an aperture size of which changes in association with said variable stop.

25. An apparatus according to claim 5, wherein said light guiding means, having the first and second end faces, for receiving the light beam at the first end face and outputting the light beam from the second end face comprises a glass rod having a hexahedron shape that totally reflects at least some light components of the light beam that enters said glass rod from the first end face.

26. An apparatus according to claim 4, wherein said deflection means and said stops are located at positions where said deflection means and said stops do not interfere with each other's functions.

27. An apparatus according to claim 2, wherein said stop means is located in the vicinity of an imaging position of the first light source image, and is separated a predetermined distance from the imaging position of the first light source image.

28. An apparatus according to claim 2, wherein said light modulation element comprises a transmission liquid crystal panel using a polymer dispersed liquid crystal.

29. An apparatus according to claim 3, wherein said light modulation element comprises a transmission liquid crystal panel using a polymer dispersed liquid crystal.

30. An apparatus according to claim 4, wherein said light modulation element comprises a transmission liquid crystal panel using a polymer dispersed liquid crystal.

31. An apparatus according to claim 5, wherein said light modulation element comprises a transmission liquid crystal panel using a polymer dispersed liquid crystal.

32. An apparatus according to claim 6, wherein said light modulation element comprises a transmission liquid crystal panel using a polymer dispersed liquid crystal.

33. An apparatus according to claim 7, wherein said light modulation element comprises a transmission liquid crystal panel using a polymer dispersed liquid crystal.

34. An apparatus according to claim 8, wherein said light modulation element comprises a transmission liquid crystal panel using a polymer dispersed liquid crystal.

35. An apparatus according to claim 9, wherein said light modulation element comprises a transmission liquid crystal panel using a polymer dispersed liquid crystal.

36. An apparatus according to claim 10, wherein said light modulation element comprises a transmission liquid crystal panel using a polymer dispersed liquid crystal.

37. An apparatus according to claim 2, wherein said light modulation element comprises a reflection liquid crystal panel using a polymer dispersed liquid crystal.

38. An apparatus according to claim 3, wherein said light modulation element comprises a reflection liquid crystal panel using a polymer dispersed liquid crystal.

39. An apparatus according to claim 4, wherein said light modulation element comprises a reflection liquid crystal panel using a polymer dispersed liquid crystal.

40. An apparatus according to claim 5, wherein said light modulation element comprises a reflection liquid crystal panel using a polymer dispersed liquid crystal.

41. An apparatus according to claim 6, wherein said light modulation element comprises a reflection liquid crystal panel using a polymer dispersed liquid crystal.

42. An apparatus according to claim 7, wherein said light modulation element comprises a reflection liquid crystal panel using a polymer dispersed liquid crystal.

43. An apparatus according to claim 8, wherein said light modulation element comprises a reflection liquid crystal panel using a polymer dispersed liquid crystal.

44. An apparatus according to claim 9, wherein said light modulation element comprises a reflection liquid crystal panel using a polymer dispersed liquid crystal.

45. An apparatus according to claim 10, wherein said light modulation element comprises a reflection liquid crystal panel using a polymer dispersed liquid crystal.

46. An apparatus according to claim 2, wherein said light modulation element comprises a transmission liquid crystal panel using a polymer network liquid crystal.

47. An apparatus according to claim 3, wherein said light modulation element comprises a transmission liquid crystal panel using a polymer network liquid crystal.

48. An apparatus according to claim 4, wherein said light modulation element comprises a transmission liquid crystal panel using a polymer network liquid crystal.

49. An apparatus according to claim 5, wherein said light modulation element comprises a transmission liquid crystal panel using a polymer network liquid crystal.

50. An apparatus according to claim 6, wherein said light modulation element comprises a transmission liquid crystal panel using a polymer network liquid crystal.

51. An apparatus according to claim 7, wherein said light modulation element comprises a transmission liquid crystal panel using a polymer network liquid crystal.

52. An apparatus according to claim 8, wherein said light modulation element comprises a transmission liquid crystal panel using a polymer network liquid crystal.

53. An apparatus according to claim 9, wherein said light modulation element comprises a transmission liquid crystal panel using a polymer network liquid crystal.

54. An apparatus according to claim 10, wherein said light modulation element comprises a transmission liquid crystal panel using a polymer network liquid crystal.

55. An apparatus according to claim 2, wherein said light modulation element comprises a reflection liquid crystal panel using a polymer network liquid crystal.

56. An apparatus according to claim 3, wherein said light modulation element comprises a reflection liquid crystal panel using a polymer network liquid crystal.

57. An apparatus according to claim 4, wherein said light modulation element comprises a reflection liquid crystal panel using a polymer network liquid crystal.

58. An apparatus according to claim 5, wherein said light modulation element comprises a reflection liquid crystal panel using a polymer network liquid crystal.

59. An apparatus according to claim 6, wherein said light modulation element comprises a reflection liquid crystal panel using a polymer network liquid crystal.

60. An apparatus according to claim 7, wherein said light modulation element comprises a reflection liquid crystal panel using a polymer network liquid crystal.

61. An apparatus according to claim 8, wherein said light modulation element comprises a reflection liquid crystal panel using a polymer network liquid crystal.

62. An apparatus according to claim 9, wherein said light modulation element comprises a reflection liquid crystal panel using a polymer network liquid crystal.

63. An apparatus according to claim 10, wherein said light modulation element comprises a reflection liquid crystal panel using a polymer network liquid crystal.

64. An apparatus according to claim 4, wherein said color-separation means for separating the white light beam emitted from said light source into the plurality of color light beams corresponding to the different wavelength ranges comprises a color-separation diffraction grating.

65. An apparatus according to claim 4, wherein said color-separation means for separating the white light beam emitted from said light source into the plurality of color light beams corresponding to the different wavelength ranges comprises a plurality of dichroic mirrors.

66. An apparatus according to claim 8, wherein said color-separation means for separating the white light beam coming from said light source into the plurality of color light beams corresponding to the different wavelength ranges comprises a plurality of dichroic mirrors.

67. An apparatus according to claim 9, wherein said color-separation means for separating the white light beam coming from said light source into the plurality of color light beams corresponding to the different wavelength ranges comprises a plurality of dichroic mirrors.

68. An apparatus according to claim 8, wherein said synthesizing means comprises a cross dichroic prism.

69. An apparatus according to claim 9, wherein said synthesizing means comprises a plurality of mirror means for reflecting the light beam.

70. An apparatus according to claim 9, wherein said deflection means comprises a plurality of mirror means for reflecting the light beam.

71. An apparatus according to claim 2, wherein said projection lens includes at least one aspherical lens.

72. An apparatus according to claim 3, wherein said projection lens includes at least one aspherical lens.

73. An apparatus according to claim 4, wherein said projection lens includes at least one aspherical lens.

74. An apparatus according to claim 5, wherein said projection lens includes at least one aspherical lens.

75. An apparatus according to claim 3, wherein said projection lens shares at least a portion of said second optical means.

76. An apparatus according to claim 3, wherein the stop of said projection lens comprises a variable stop, an aperture size of which changes in association with said variable stop.

77. An apparatus according to claim 4, wherein the stop of said projection lens comprises a variable stop, an aperture size of which changes in association with said variable stop.

78. An apparatus according to claim 5, wherein the stop of said projection lens comprises a variable stop, an aperture size of which changes in association with said variable stop.

* * * * *